United States Patent
Jang

(10) Patent No.: US 11,461,238 B2
(45) Date of Patent: Oct. 4, 2022

(54) STORAGE DEVICE, MEMORY CONTROLLER, AND METHOD FOR FETCHING WRITE COMMANDS FROM SUBMISSION QUEUES TO PERFORM FULL PAGE WRITES

(71) Applicant: SK hynix Inc., Icheon (KR)

(72) Inventor: Eun Soo Jang, Icheon (KR)

(73) Assignee: SK hynix Inc., Icheon (KR)

( * ) Notice: Subject to any disclaimer, the term of this patent is extended or adjusted under 35 U.S.C. 154(b) by 29 days.

(21) Appl. No.: 16/851,001

(22) Filed: Apr. 16, 2020

(65) Prior Publication Data

US 2021/0064542 A1    Mar. 4, 2021

(30) Foreign Application Priority Data

Aug. 28, 2019   (KR) ........................ 10-2019-0105678

(51) Int. Cl.
*G06F 12/12*     (2016.01)
*G06F 3/06*     (2006.01)

(52) U.S. Cl.
CPC .............. *G06F 12/12* (2013.01); *G06F 3/061* (2013.01); *G06F 3/0659* (2013.01); *G06F 3/0679* (2013.01); *G06F 2212/1041* (2013.01)

(58) Field of Classification Search
CPC ........................ G06F 12/12; G06F 2212/1041
See application file for complete search history.

(56) References Cited

U.S. PATENT DOCUMENTS

| 2015/0324281 A1* | 11/2015 | Takefman ........... G06F 12/0246 711/103 |
| 2017/0160932 A1* | 6/2017 | Thakkar .............. G06F 11/1068 |
| 2017/0249209 A1* | 8/2017 | Yang ....................... G06F 3/064 |
| 2018/0188975 A1* | 7/2018 | Benisty ................. G06F 3/0659 |
| 2019/0012115 A1* | 1/2019 | Lovell ................... G06F 3/0608 |

FOREIGN PATENT DOCUMENTS

KR      1624007 B1    5/2016

* cited by examiner

*Primary Examiner* — Charles Rones
*Assistant Examiner* — Hewy H Li

(57) ABSTRACT

A memory controller for controlling a plurality of memory chips of a non-volatile memory includes a first core configured to identify a size of a remaining space of a page to be written in a memory chip on which a write operation is to be performed among the plurality of memory chips and fetch a first write command from a first submission queue among a plurality of submission queues included in a host, the first write command being related to data having a size corresponding to that of the remaining space of the page to be written, and a second core configured to control the non-volatile memory to store data related to the fetched first write command in the remaining space of the page to be written.

16 Claims, 18 Drawing Sheets

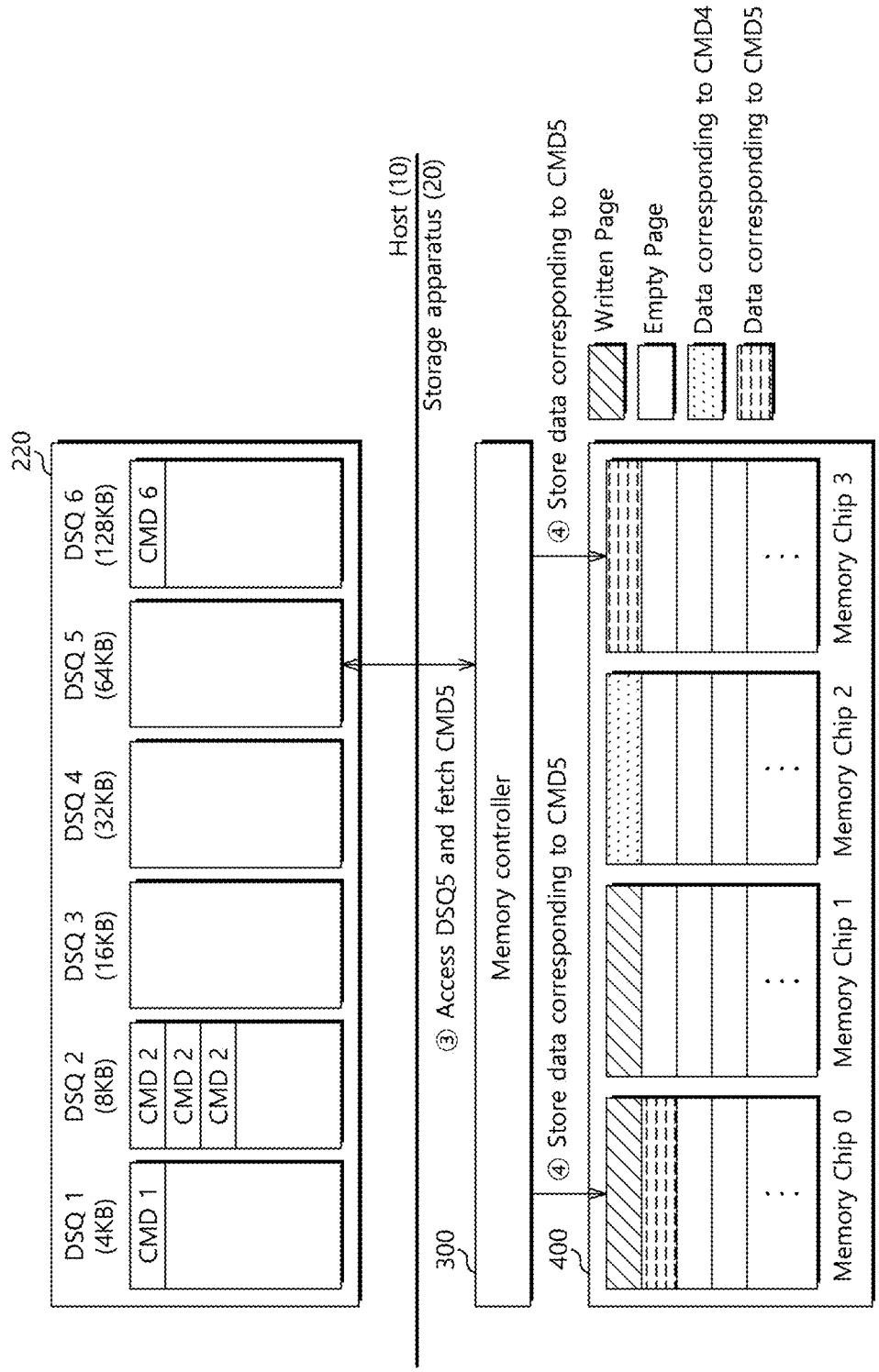

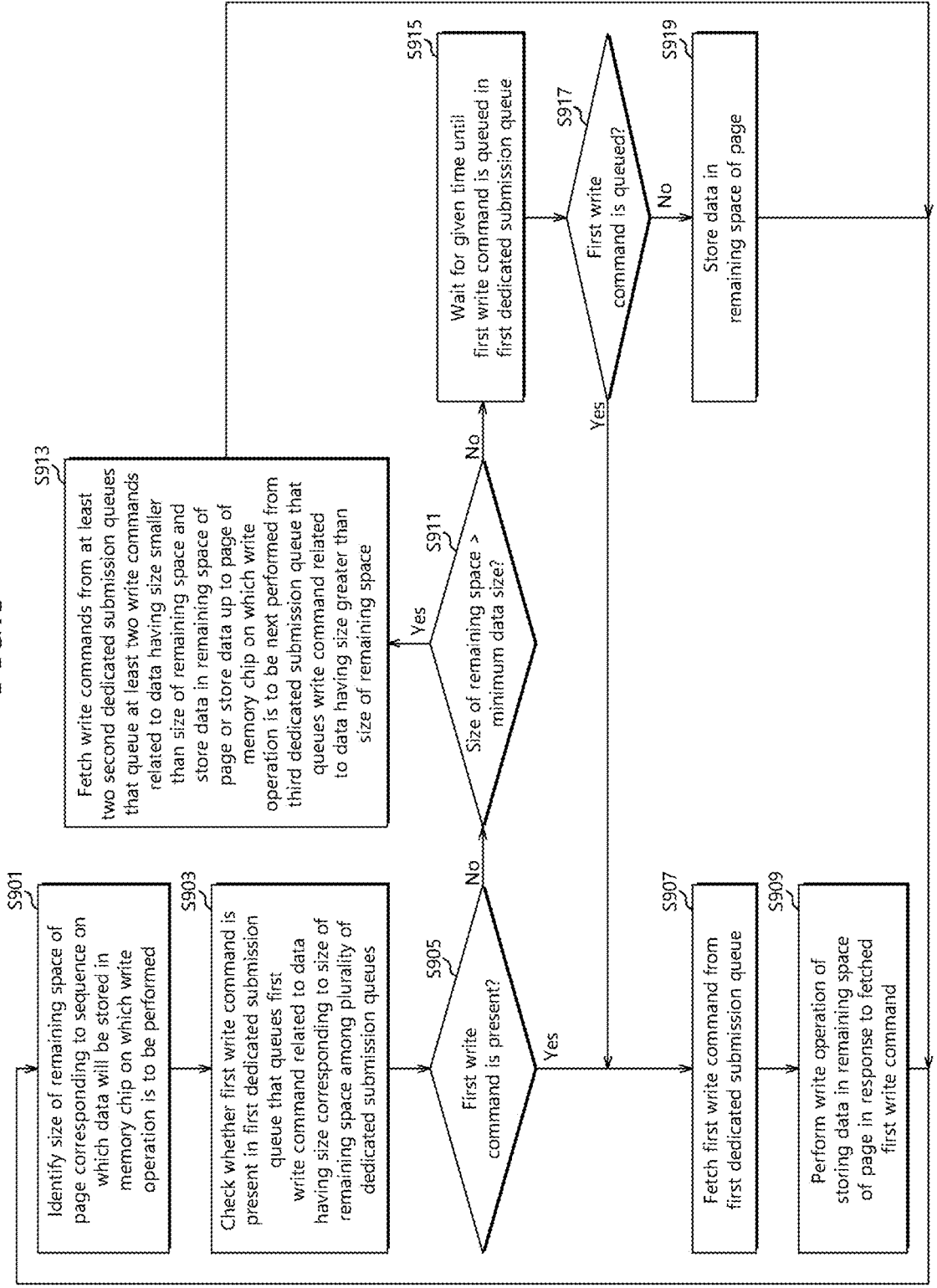

STORAGE DEVICE, MEMORY CONTROLLER, AND METHOD FOR FETCHING WRITE COMMANDS FROM SUBMISSION QUEUES TO PERFORM FULL PAGE WRITES

CROSS-REFERENCE TO RELATED APPLICATION

The present application claims priority under 35 U.S.C. § 119(a) to Korean application number 10-2019-0105678, filed on Aug. 28, 2019, in the Korean Intellectual Property Office, which is incorporated herein by reference in its entirety.

BACKGROUND

1. Technical Field

Various embodiments generally relate to an electronic apparatus, and particularly, to a memory controller, a storage apparatus including the memory controller, and an operating method of the memory controller.

2. Related Art

A semiconductor memory is divided into a volatile memory which loses stored data therein when power supply is cut off, such as a static RAM (SRAM), a dynamic RAM (DRAM), and a synchronous DRAM (SDRAM), and a non-volatile memory which retains stored data therein although power supply is cut off, such as a read only memory (ROM), a programmable ROM (PROM), an electrically programmable ROM (EPROM), an electrically erasable and programmable ROM (EEPROM), a flash memory apparatus, a phase-change RAM (PRAM), a magnetic RAM (MRAM), a resistive RAM (RRAM), and a ferroelectric RAM (FRAM).

SUMMARY

Various embodiments are directed to a memory controller, a storage apparatus including the memory controller, and an operating method of the memory controller, which can improve read performance.

In an embodiment, A memory controller for controlling a plurality of memory chips of a non-volatile memory includes a first core configured to identify a size of a remaining space of a page to be written in a memory chip on which a write operation is to be performed among the plurality of memory chips and fetch a first write command from a first submission queue among a plurality of submission queues included in a host, the first write command being related to data having a size corresponding to that of the remaining space of the page to be written, and a second core configured to control the non-volatile memory to store data related to the fetched first write command in the remaining space of the page to be written.

In an embodiment, a storage apparatus includes a non-volatile memory comprising a plurality of memory chips; a memory configured to store submission queue information comprising information on each of a plurality of submission queues that are included in a host and store non-volatile memory state information comprising a size of a remaining space of a page to be written in a memory chip on which a write operation is to be performed among the plurality of memory chips; and a memory controller configured to identify the size of the remaining space of the page to be written based on the non-volatile memory state information, access a first submission queue among the plurality of submission queues based on the submission queue information to determine whether a first write command is present in the first submission queue, the first write command being related to data having a size corresponding to that of the remaining space of the page to be written, and fetch the first write command from the first submission queue.

In an embodiment, an operating method of a memory controller that controls a non-volatile memory includes identifying a size of a remaining space of a page to be written in a memory chip on which a write operation is to be performed; accessing a first submission queue among a plurality of submission queues that are included in a host and fetching a first write command from the first submission queue, the first write command being related to data having a size corresponding to that of the remaining space of the page to be written; and controlling the non-volatile memory to store the data in the remaining space of the page to be written in response to the first write command.

According to embodiments, read performance for a storage apparatus can be improved because data related to a single command can be prevented from being divided and stored in two memory chips.

BRIEF DESCRIPTION OF THE DRAWINGS

FIGS. 7A, 7B, 7C, 7D, 7E, and 7F are diagrams illustrating a process of fetching a command and writing data based on the size of the remaining space of a subpage and the queuing states of dedicated submission queues according to an embodiment.

FIG. 9 is a flowchart illustrating an operating method of a memory controller according to an embodiment.

DETAILED DESCRIPTION

Hereinafter, a memory controller, a storage apparatus including the memory controller, and an operating method of the memory controller will be described below with reference to the accompanying drawings through various embodiments.

Figure 1:
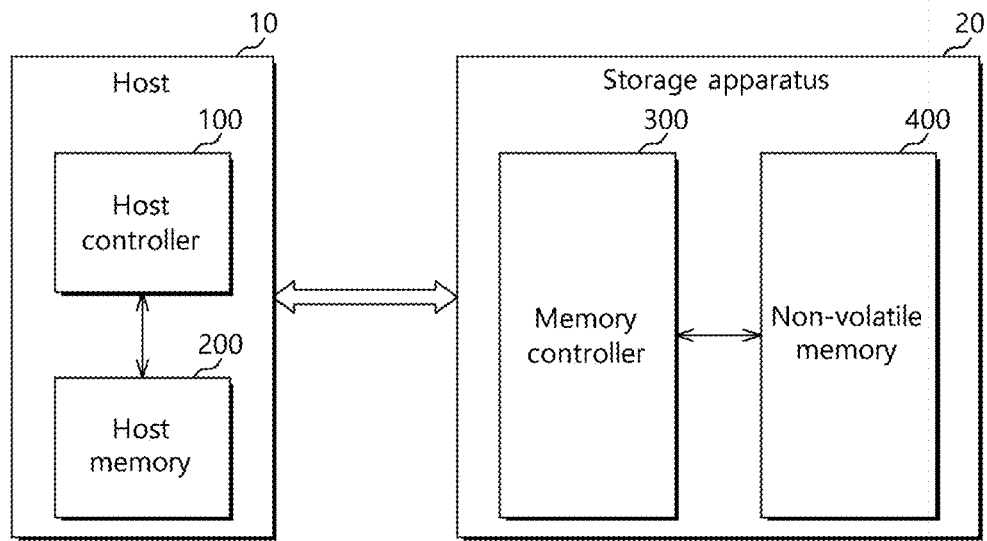
FIG. 1 is a diagram illustrating a data storage system according to an embodiment.

FIG. 1 is a diagram illustrating a data storage system 1000 according to an embodiment.

Referring to FIG. 1, the data storage system 1000 may include a host 10 and a storage apparatus 20. The host 10 may include a mobile phone, an MP3 player, a laptop computer, a desktop computer, a game machine, TV, an in-vehicle infotainment system, etc.

The host 10 may include a host controller 100 and a host memory 200.

The host controller 100 may be configured to control an overall operation of the host 10. Although not illustrated in FIG. 1, the host controller 100 may include at least one central processing unit (CPU).

The host memory 200 may be configured to temporarily store a command, data, etc. to be transmitted from the host controller 100 to the storage apparatus 20. Furthermore, the host memory 200 may be configured to temporarily store a response received from the storage apparatus 20. The host memory 200 may be a random access memory, such as a dynamic random access memory (DRAM) or a static random access memory (SRAM), but is not specially limited thereto. The host memory 200 may be accessed by the memory controller 300 of the storage apparatus 20 in addition to the host controller 100. The host controller 100 and host memory 200 of the host 10 will be described in detail later with reference to FIGS. 5, 6A, and 6B.

The storage apparatus 20 may store data accessed by the host 10. The storage apparatus 20 may be called a memory system.

The storage apparatus 20 may be configured with any one of various types of storage apparatuses depending on an interface protocol electrically coupled to the host 10. For example, the storage apparatus 20 may be configured with any one of various types of storage apparatuses, such as a multimedia card having a solid state drive (SSD), MMC, eMMC, RS-MMC or micro-MMC form, a secure digital card having an SD, mini-SD or micro-SD form, a storage apparatus having a universal serial bus (USB) storage apparatus, universal flash storage (UFS) apparatus or personal computer memory card international association (PCMCIA) card form, a storage apparatus having a peripheral component interconnection (PCI) card form, a storage apparatus having a PCI-express (PCI-e) card form, a compact flash (CF) card, a smart media card, and a memory stick.

The storage apparatus 20 may be fabricated as one of various types of package forms. For example, the storage apparatus 20 may be fabricated as one of various types of packages forms, such as a package on package (POP), a system in package (SIP), a system on chip (SOC), a multi-chip package (MCP), a chip on board (CPB), a wafer-level fabricated package (WFP), and a wafer-level stack package (WSP).

The storage apparatus 20 may include the memory controller 300 and a non-volatile memory 400.

The memory controller 300 may be configured to control an overall operation of the storage apparatus 20. The memory controller 300 may process a request received from the host 10. The memory controller 300 may generate one or more control signals for controlling an operation of the non-volatile memory 400 in response to a request received from the host 10, and may provide the generated control signals to the non-volatile memory 400. The memory controller 300 will be described in detail later with reference to FIGS. 2 and 3.

The non-volatile memory 400 may operate as a data storage medium of the storage apparatus 20. The non-volatile memory 400 may be configured with any one of various forms of non-volatile memories, such as a NAND flash memory apparatus, a NOR flash memory apparatus, a ferroelectric random access memory (FRAM) using a ferroelectric capacitor, a magnetic random access memory (MRAM) using a tunneling magneto-resistive (TMR) film, a phase change random access memory (PRAM) using chalcogenide alloys, and a resistive random access memory (ReRAM) using transition metal oxide, depending on a memory cell.

The non-volatile memory 400 in FIG. 1 may include one or more memory chips (or dies). The present embodiment may also be identically applied to the storage apparatus 20 including the non-volatile memory 400 configured with a plurality of memory chips.

The non-volatile memory 400 may include a memory cell array (not illustrated) having a plurality of memory cells disposed at respective areas in which a plurality of bit lines (not illustrated) and a plurality of word lines (not illustrated) intersect each other. The memory cell array may include a plurality of memory blocks. Each of the plurality of memory blocks may include a plurality of pages.

For example, each of the memory cells of the memory cell array may be a single level cell (SLC) for storing 1 bit, a multi-level cell (MLC) capable of storing 2-bit data, a triple level cell (TLC) capable of storing 3-bit data, or a quad level cell (QLC) capable of storing 4-bit data. The memory cell array may include one or more of an SLC, an MLC, a TLC, and a QLC. For example, the memory cell array may include memory cells having a two-dimensional horizontal structure or memory cells having a three-dimensional vertical structure.

Figure 2:
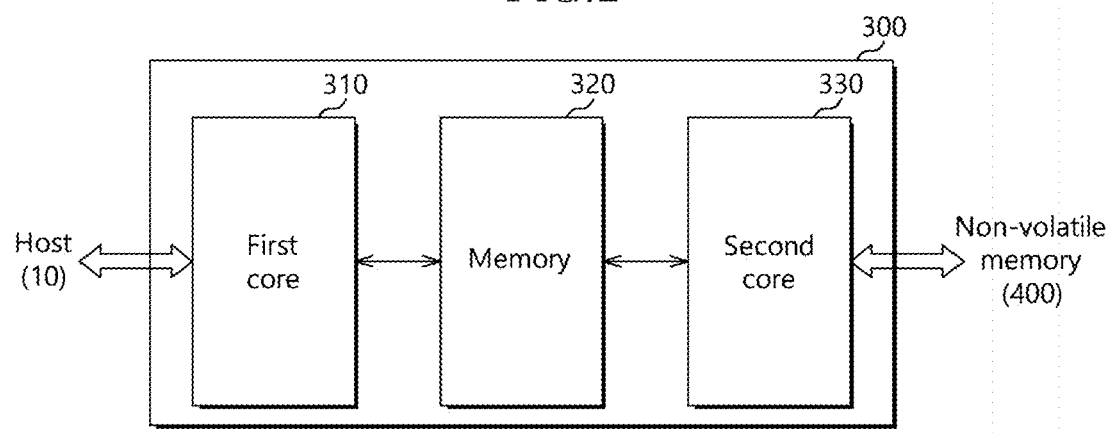
FIG. 2 is a diagram illustrating the configuration of a memory controller of FIG. 1 according to an embodiment.

FIG. 2 is a diagram illustrating the configuration of the memory controller 300 of FIG. 1 according to an embodiment.

Referring to FIG. 2, the memory controller 300 may include a first core 310, a memory 320, and a second core 330.

The first core 310 may be configured to provide an interface between the host 10 and the storage apparatus 20 in accordance with a protocol of the host 10. Accordingly, the first core 310 may also be called a protocol core or a host interface layer (HIL).

For example, the first core 310 may communicate with the host 10 through any one of protocols, such as a universal serial bus (USB), a universal flash storage (UFS), a multimedia card (MMC), parallel advanced technology attachment (PATA), serial advanced technology attachment (SATA), a small computer system interface (SCSI), a serial attached SCSI (SAS), a peripheral component interconnection (PCI), and PCI express (PCI-e). The first core 310 may include a micro control unit (MCU) and a central processing unit (CPU).

The first core 310 may access the host memory 200 of the host 10. For example, upon a write operation, the first core 310 may access a specific location of the host memory 200, may fetch a command (e.g., write command) from the specific location, may read data corresponding to the fetched write command by accessing another specific location, and may store the read data in the memory 320.

For example, the first core 310 may identify the size of the remaining space of one page (hereinafter referred to as a "page to be written") on which data will be stored in a memory chip on which a next write operation will be performed in the non-volatile memory 400. For example, one page may refer to one physical page including memory cells electrically coupled to one word line. Furthermore, the first core 310 may access a location of the host memory 200 at which a write command related to data having a size corresponding to the size of the remaining space of a page to be written is queued, may fetch a write command from the location of the host memory 200, may read data from the host memory 200 based on the fetched write command, and may store the read data in a write buffer (e.g., a write buffer in FIG. 3) of the memory 320. Furthermore, the first core 310 may provide the fetched write command to the second core 330.

Although not illustrated in FIG. 2, the memory controller 300 may further include a data transmission block (not illustrated) for reading data by accessing the host memory 200 under the control of the first core 310 and storing the read data in the write buffer of the memory 320.

Furthermore, upon a read operation, the first core 310 may access a specific location of the host memory 200, may fetch a command (e.g., read command) from the specific location, and may provide the fetched read command to the second core 330. Furthermore, the first core 310 transmit, to the host 10, data (e.g., read data) stored in the read buffer (e.g., a read buffer in FIG. 3) of the memory 320. For example, the data transmission block may transmit, to the host 10, data stored in the read buffer of the memory 320 in response to a control signal received from the first core 310.

The memory 320 may be configured with a random access memory, such as a static random access memory (SRAM) or a dynamic random access memory (DRAM), but is not specially limited thereto. FIG. 2 illustrates that the memory 320 has been included in the memory controller 300, but the memory 320 may be positioned outside the memory controller 300.

The memory 320 may be physically and electrically coupled to the first core 310 and the second core 330. The memory 320 may store firmware executed by the second core 330. Furthermore, the memory 320 may store data necessary for the execution of firmware, for example, metadata. That is, the memory 320 may operate as a working memory of the second core 330.

Furthermore, the memory 320 may be configured to include a buffer for temporarily storing write data to be transmitted from the host 10 to the non-volatile memory 400 and read data to be transmitted from the non-volatile memory 400 to the host 10. That is, the memory 320 may operate as a buffer memory. The internal configuration of the memory 320 will be described in detail later with reference to FIG. 3.

The second core 330 may control an overall operation of the storage apparatus 20 through the execution of firmware or software loaded on the memory 320. The second core 330 may decode and execute an instruction or algorithm having a code form, such as firmware or software. Accordingly, the second core 330 may also be called a flash translation layer (FTL) or an FTL core. The second core 330 may include a micro control unit (MCU) and a central processing unit (CPU).

The second core 330 may generate one or more control signals for controlling an operation of the non-volatile memory 400 based on a command provided by the first core 310, and may provide the generated control signals to the non-volatile memory 400. The control signals may include a command, an address, an operation control signal, etc. for controlling the non-volatile memory 400. The second core 330 may provide the non-volatile memory 400 with write data temporarily stored in the memory 320, or may be provided with read data from the non-volatile memory 400 to temporarily store the read data in the memory 320.

Figure 3:
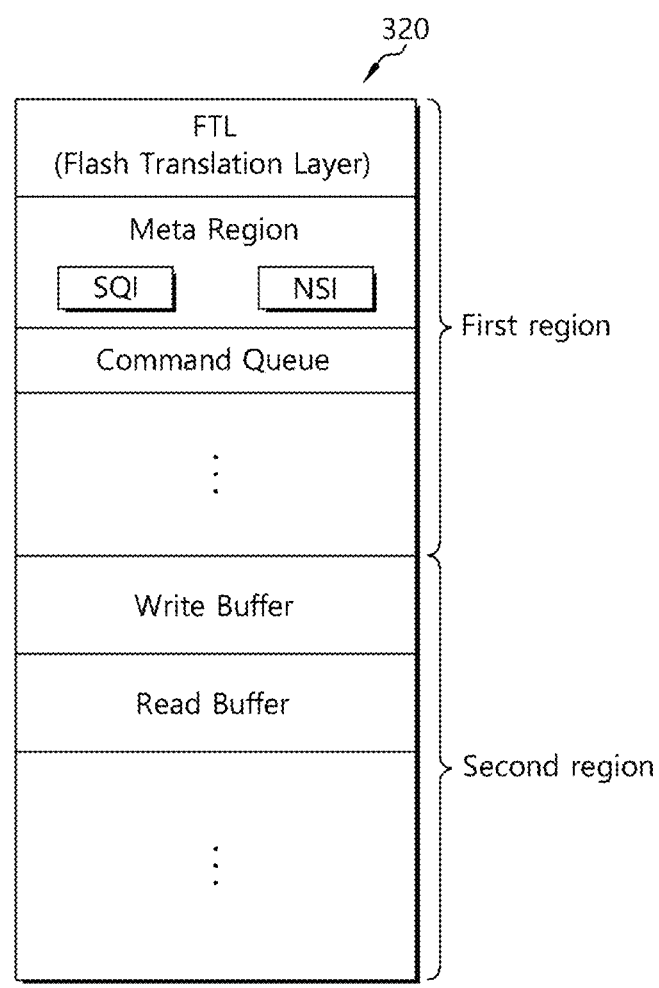
FIG. 3 is a diagram illustrating the configuration of a memory of FIG. 2 according to an embodiment.

FIG. 3 is a diagram illustrating the configuration of the memory 320 of FIG. 2 according to an embodiment.

Referring to FIG. 3, the memory 320 according to the present embodiment may be basically divided into a first region and a second region, but is not specially limited thereto.

For example, software (or firmware) decoded and executed by the second core 330 and metadata necessary to perform operation and processing operations in the second core 330 may be stored in the first region of the memory 320. Furthermore, commands fetched by the first core 310 from the host 10 may be queued in the first region of the memory 320.

For example, software stored in the first region of the memory 320 may be an FTL. The FTL may be executed by the second core 330. The second core 330 may control a unique operation of the non-volatile memory 400 by executing the FTL, and may provide device compatibility to the host 10. The host 10 may recognize and use the storage apparatus 20 as a common storage apparatus, such as a hard disk, through the execution of the FTL.

The FTL may be stored in a system region (not illustrated) of the non-volatile memory 400. When the storage apparatus 20 is powered on, the FTL may be read from the system region of the non-volatile memory 400 and loaded on the first region of the memory 320. In another embodiment, the FTL may be loaded on a dedicated memory (not illustrated) of the second core 330 provided within the second core 330.

The FTL may include modules for performing several functions. For example, the FTL may include a read module, a write module, a garbage collection module, a wear-leveling module, a bad block management module, and a map module, but is not specially limited thereto. For example, each of the modules included in the FTL may be configured with a set of source codes for performing a specific operation (or function).

The first region of the memory 320 may include a meta region in which metadata necessary for the driving of various modules included in the FTL is stored.

In the present embodiment, submission queue information (hereinafter referred to as "SQI") related to submission queues included in the host 10 may be stored in the meta region of the memory 320. The SQI may be generated and provided by the host 10. The SQI may include a depth, a base address, an identification (ID), the type of a queued command, and the size of data related to a queued command for each of a plurality of submission queues, but is not specially limited thereto. In another embodiment, the SQI may be stored in a dedicated memory (not illustrated) of the first core 310 provided within the first core 310. The SQI will be described in detail later with reference to FIGS. 5, 6A, and 6B.

In the present embodiment, state information on the non-volatile memory 400 (hereinafter referred to as "non-volatile memory state information (NSI)") may be stored in the meta region of the memory 320. The NSI may include the size of the remaining space of a page to be written in a next write operation on the non-volatile memory 400. The NSI may be updated in real time by the second core 330.

As described above, the non-volatile memory 400 may include a plurality of memory chips. The plurality of memory chips included in the non-volatile memory 400 may be grouped into a plurality of memory chip groups depending on the number of channels electrically coupling the memory controller 300 and the non-volatile memory 400.

Each of the plurality of memory chip groups may include one or more memory chips. Corresponding memory blocks within one or more memory chips included in each of the plurality of memory chip groups may be grouped as one memory block group. Furthermore, corresponding pages within a memory block group may be grouped as one page group.

That is, one memory chip group may include a plurality of page groups. Furthermore, each of the plurality of page groups may be configured to include corresponding pages in each of one or more memory chips included in a corresponding memory chip group.

For example, assuming that one memory chip group includes four memory chips, one page group may include four pages. Each of the four pages may be one page included in a corresponding one of the four memory chips.

In order to improve sequential read performance for the storage apparatus 20, data needs to be written in the storage apparatus 20 so that the corresponding data is read by an interleaving operation. The interleaving operation may indicate that a plurality of memory chips included in the non-volatile memory 400 is controlled in parallel so that the idle time of each of the memory chips is minimized for achieving high-speed data processing.

Figure 4A:
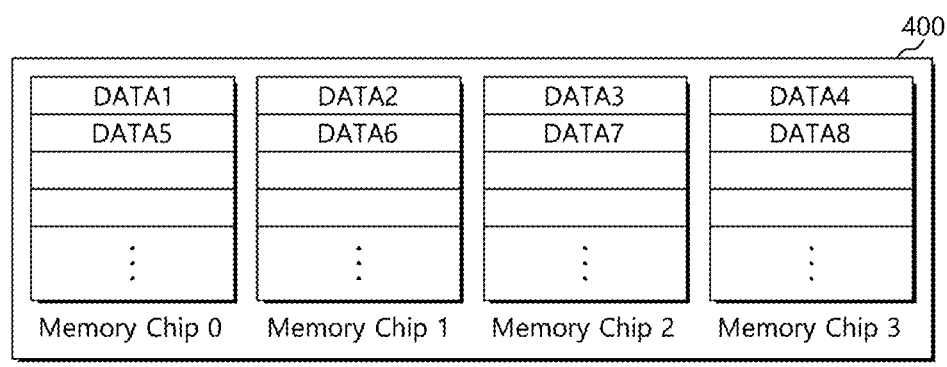
FIG. 4A illustrates an example in which data has been stored without a cutoff phenomenon.
Figure 4B:
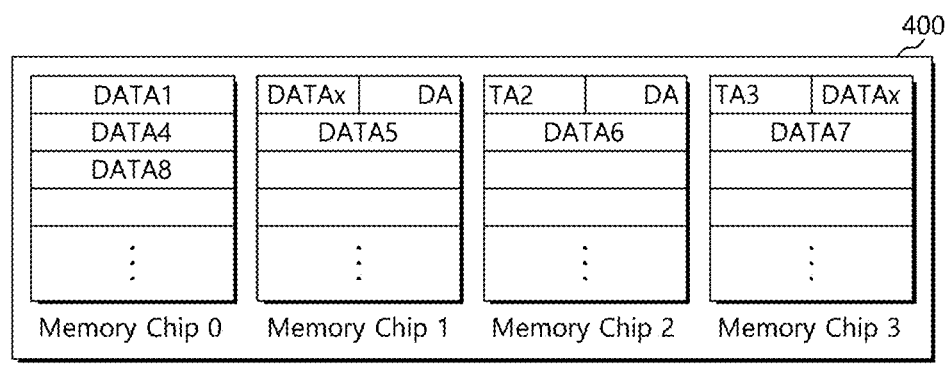
FIG. 4B illustrates an example in which data has been divided and stored in a plurality of memory chips.

FIG. 4A illustrates an example in which data has been stored without a cutoff phenomenon. Specifically, none of first to eighth data DATA 1 to DATA8 has been divided into a plurality of portions and stored in a plurality of memory chips in the example of FIG. 4A. FIG. 4B illustrates an example in which data has been divided and stored in a plurality of memory chips. In FIGS. 4A and 4B, it is assumed that first data to eighth data DATA1 to DATA8 are data related to a first command to an eighth command (not illustrated), respectively. Furthermore, it is assumed that the size of each of the first data to the eighth data DATA1 to DATA8 corresponds to the size of a page included in each of a first memory chip 0 to a fourth memory chip 3.

A high-capacity file, such as music or a moving image, is segmented into data of a given size, and may be processed by a command related to each of the segmented data. For example, assuming that a file of 1 MB is segmented into data of 128 KB, a file of 1 MB may be stored by segmenting the file of 1 MB into eight data each having a size of 128 KB and processing eight commands corresponding to the segmented eight data each having the size of 128 KB, respectively.

In this case, the host controller 100 may randomly distribute and queue the eight commands for the file of 1 MB in a plurality of submission queues included in the host memory 200.

In general, the memory controller 300 cannot be aware of information on commands queued in the submission queues of the host memory 200, and thus it may access a plurality of submission queues sequentially, may fetch a command from the submission queues, and may control the non-volatile memory 400 to perform an operation corresponding to the fetched command.

If eight commands for a file of 1 MB have been sequentially queued in consecutive eight submission queues, the memory controller 300 may sequentially fetch the eighth commands from the eight submission queues, and may process the eight commands. As a result, as illustrated in FIG. 4A, the first data DATA1 to the eighth data DATA8 corresponding to the file of 1 MB may be sequentially written in the non-volatile memory 400. That is, each of the first data DATA1 to the eighth data DATA8 may be stored in a page of each of the first memory chip 0 to the fourth memory chip 3 without a cutoff phenomenon.

In such a case, when a read command for the file of 1 MB is received, read operations for the first data DATA1 to the eighth data DATA8 can be performed at a relatively high speed. The first memory chip 0 to the fourth memory chip 3 can operate in parallel. Accordingly, the respective read operations for the first data DATA1 to the fourth data DATA4 can be performed sequentially or simultaneously. The read operations for the respective fifth data DATA 5 to eighth data DATA8 can be performed sequentially or simultaneously as soon as the read operations for the first data DATA1 to the fourth data DATA4 are completed.

Accordingly, each of the first memory chip 0 to the fourth memory chip 3 of the non-volatile memory 400 performs two read operations. The non-volatile memory 400 performs a total of the eight read operations in accordance with the read command for the file of 1 MB.

However, if the eight commands for the file of 1 MB have been randomly queued in inconsecutive eight submission queues, the memory controller 300 may fetch and process other commands while fetching and processing the eight commands. In such a case, as illustrated in FIG. 4B, the second data DATA2 may be divided into two portions and written in two memory chips (e.g., the second memory chip 1 and third memory chip 2). Furthermore, the third data DATA3 may be divided into two portions and written in two memory chips (i.e., the third memory chip 2 and fourth memory chip 3).

In such a case, when a read command for a file of 1 MB is received, a read operation for the first data DATA1 to the eighth data DATA8 may be performed at a lower speed compared to that of the example in FIG. 4A. For example, the second data DATA2 may be read by driving the two memory chips (i.e., the second memory chip 1 and third memory chip 2), and the third data DATA3 may be read by driving the two memory chips (i.e., the third memory chip 2 and fourth memory chip 3). Furthermore, the third data DATA3 cannot be read until the second data DATA2 is completely read because some of the second data DATA2 and some of the third data DATA3 have been stored in one memory chip (i.e., the third memory chip 2). That is, the read operations for the second data DATA2 and the third data DATA3 can be performed only sequentially, rather than simultaneously.

In contrast, in FIG. 4A, three memory chips (i.e., the first memory chip 0 to the third memory chip 2) are driven three times in total to read the first data DATA1 to the third data DATA3 because the first data DATA1 to the third data DATA3 can be read simultaneously and each of the first memory chip 0 to third memory chip 2 has only to be driven once. In FIG. 4B, however, the first memory chip 0 to the fourth memory chip 3 need to be driven five times in total to read the first data DATA1 to third data DATA3 because the second data DATA2 and the third data DATA3 cannot be read simultaneously and the third memory chip 2 needs to be driven twice.

If data related to one command is divided and stored in two memory chips as described above, read performance becomes significantly deteriorated.

Referring back to FIG. 3, the second region of the memory 320 may include a write buffer and a read buffer.

The write buffer may be configured to temporarily store write data to be transmitted from the host 10 to the non-volatile memory 400. The read buffer may be configured to temporarily store read data that is read from the non-volatile memory 400 and that is to be transmitted to the host 10.

The distance between the first region of the memory 320 and the first core 310, or between the first region of the memory 320 and the second core 330 may be shorter than the distance between the second region of the memory 320 and the first core 310 or between the second region of the memory 320 and the second core 330, but embodiments of the present disclosure are not specially limited thereto. The first core 310 and the second core 330 can rapidly access the first region of the memory 320 because the first region of the memory 320 is physically close to the first or second core 310 or 330. Accordingly, an overall processing speed can be improved.

Figure 5:
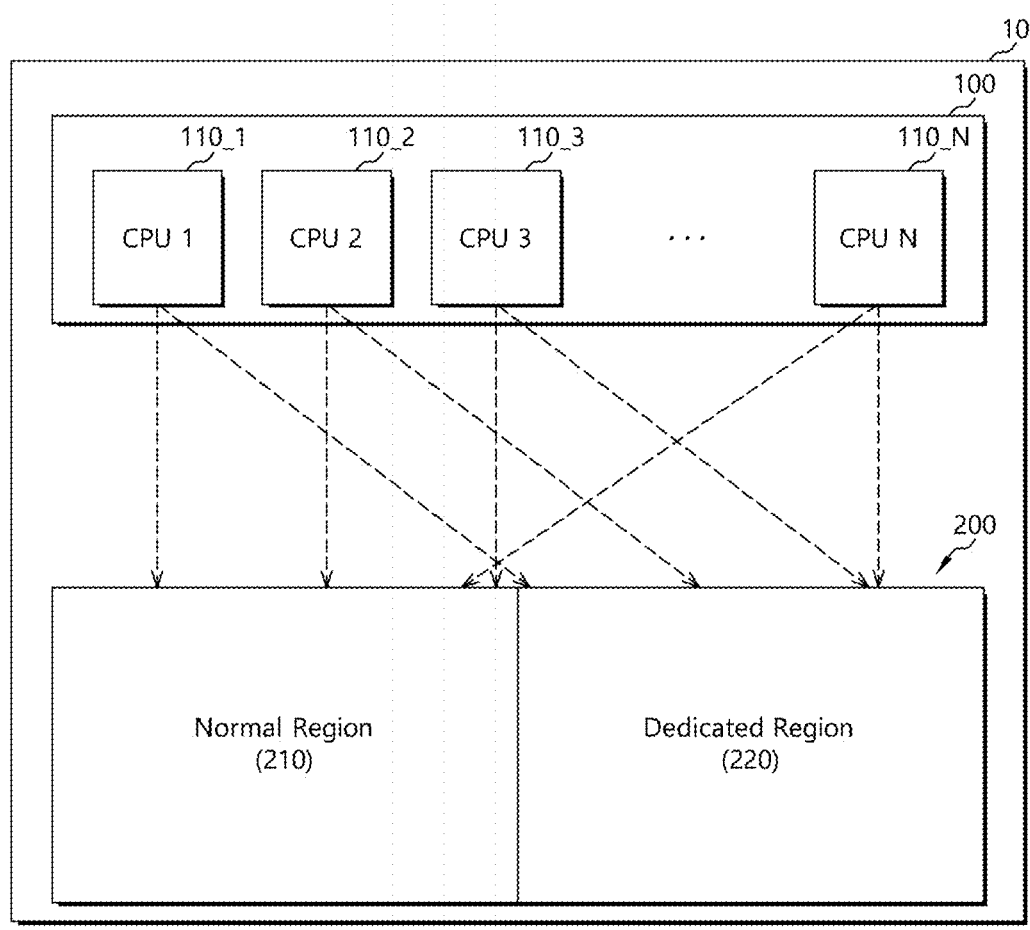
FIG. 5 is a diagram illustrating a host controller and a host memory illustrated in FIG. 1 according to an embodiment.

FIG. 5 is a diagram illustrating the configuration of the host 10 of FIG. 1 according to an embodiment.

Referring to FIG. 5, the host 10 may include the host controller 100 and the host memory 200. Contents described above regarding the host controller 100 and the host memory 200 may be omitted herein for the interest of brevity.

Referring to FIG. 5, the host controller 100 may include a plurality of central processing units (CPUs) CPU 1 to CPU N (110_1 to 110_N). The host memory 200 may include a normal region 210 and a dedicated region 220. The plurality of CPUs 110_1 to 110_N of the host controller 100 may access both the normal region 210 and dedicated region 220 of the host memory 200.

Although not illustrated in FIG. 5, the normal region 210 of the host memory 200 may include a plurality of normal submission queues. Furthermore, the normal region 210 of the host memory 200 may include a buffer space configured to temporarily store data.

Commands related to data having a size not corresponding to dedicated submission queues to be described later may be queued in the normal submission queues, but embodiments of the present disclosure are not specially limited thereto. The dedicated region 220 of the host memory 200 may include a plurality of dedicated submission queues. This will be described in detail with reference to FIGS. 6A and 6B.

Figure 6A:
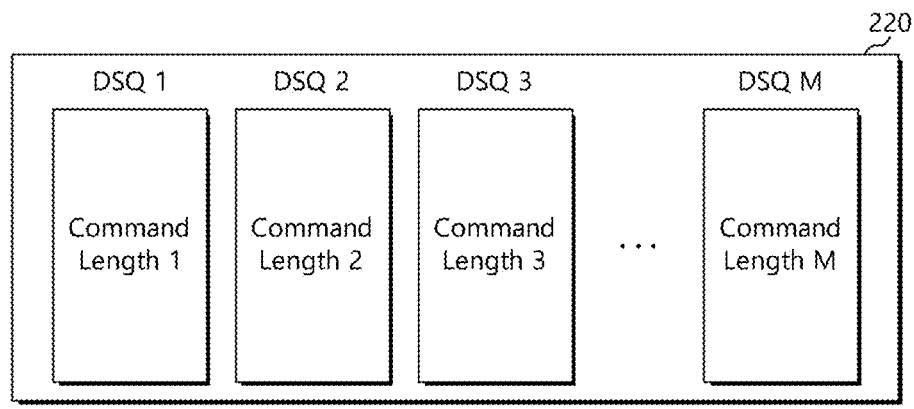
FIGS. 6A and 6B are diagrams each illustrating the configuration of a dedicated region of the host memory illustrated in FIG. 5 according to an embodiment.
Figure 6B:
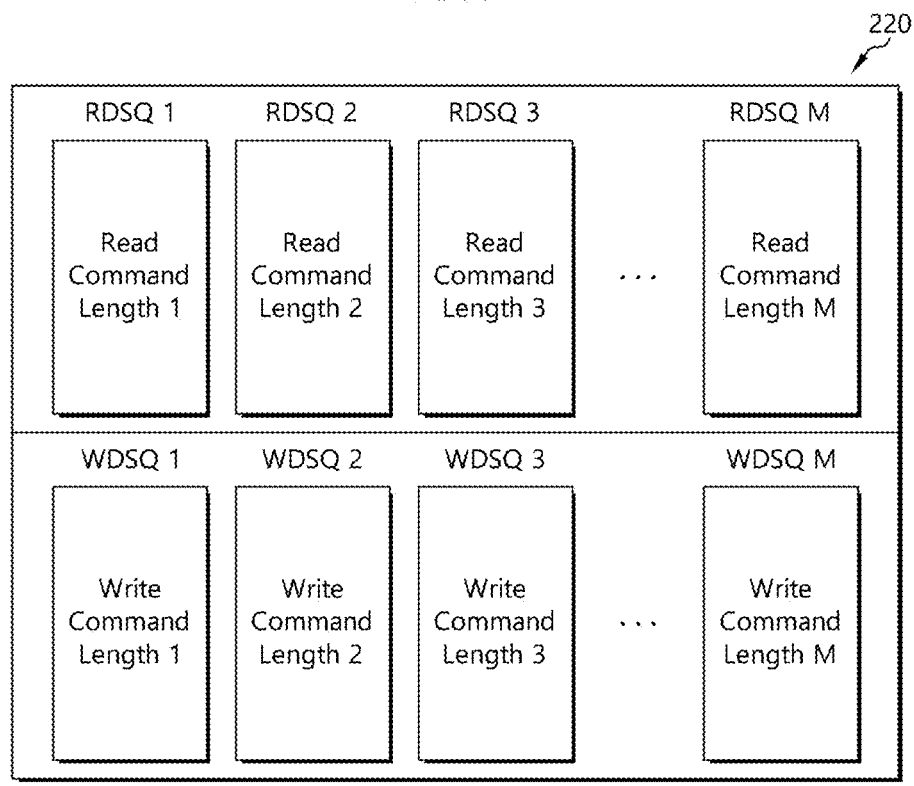

FIGS. 6A and 6B are diagrams illustrating the configuration of the dedicated region 220 of the host memory 200 according to various embodiments.

Referring to FIG. 6A, the dedicated region 220 of the host memory 200 may include a plurality of dedicated submission queues DSQ 1 to DSQ M. Each of the plurality of dedicated submission queues DSQ 1 to DSQ M may queue a command having a specific length (or size). The command having a specific length (or size) may indicate the size of related data.

For example, the first dedicated submission queue DSQ 1 may queue a first command having a first length Length 1. Furthermore, the second dedicated submission queue DSQ 2 may queue a second command having a second length Length 2. The third dedicated submission queue DSQ 3 may queue a third command having a third length Length 3. The $M^{th}$ dedicated submission queue DSQ M may queue an $M^{th}$ command having an $M^{th}$ length Length M.

The plurality of dedicated submission queues DSQ 1 to DSQ M may be allocated to a specific area within the host memory 200 by the host controller 100. The host controller 100 may allocate the plurality of dedicated submission queues DSQ 1 to DSQ M to a specific region within the host memory 200, and may provide the memory controller 300 of the storage apparatus 20 with information related to the plurality of dedicated submission queues DSQ 1 to DSQ M.

The information related to the plurality of dedicated submission queues DSQ 1 to DSQ M may include a depth, base address, identification (ID), type (e.g., read or write) of queued command, and size of related data of each of the plurality of dedicated submission queues DSQ 1 to DSQ M. The memory controller 300 may store information, related to the plurality of dedicated submission queues DSQ 1 to DSQ M provided by the host controller 100, in the meta region of the memory 320 as SQI. The memory controller 300 may access a specific dedicated submission queue that queues a command related to data having a desired size based on the SQI stored in the memory 320, and may fetch a command from the specific dedicated submission queue.

Referring to FIG. 6B, the dedicated region 220 of the host memory 200 may be divided into multiple spaces depending on the type of command. For example, a plurality of read dedicated submission queues RDSQ 1 to RDSQ M that queue read commands may be allocated to one space of the dedicated region 220. Furthermore, a plurality of write dedicated submission queues WDSQ 1 to WDSQ M that queue write commands may be allocated to the other space of the dedicated region 220. FIG. 6B illustrates only the read dedicated submission queues that queue read commands and the write dedicated submission queues that queue write commands, but embodiments of the present disclosure are not specially limited thereto. The dedicated region 220 may include multiple spaces to which submission queues for queuing various types of commands have been allocated.

FIGS. 7A, 7B, 7C, 7D, 7E, and 7F are diagrams illustrating a process of fetching one or more commands and writing data based on the size of the remaining space of a subpage and the queuing states of dedicated submission queues, according to an embodiment. It is assumed that the non-volatile memory 400 includes four memory chips (e.g., first memory chip 0 to fourth memory chip 3). Furthermore, it is assumed that the size of each of pages included in one memory chip is 32 KB. Furthermore, it is assumed that the host 10 includes six dedicated submission queues DSQ1 to DSQ6 and the six dedicated submission queues DSQ1 to DSQ6 queue commands related to data of 4 KB, 8 KB, 16 KB, 32 KB, 64 KB, and 128 KB, respectively.

Figure 7A:
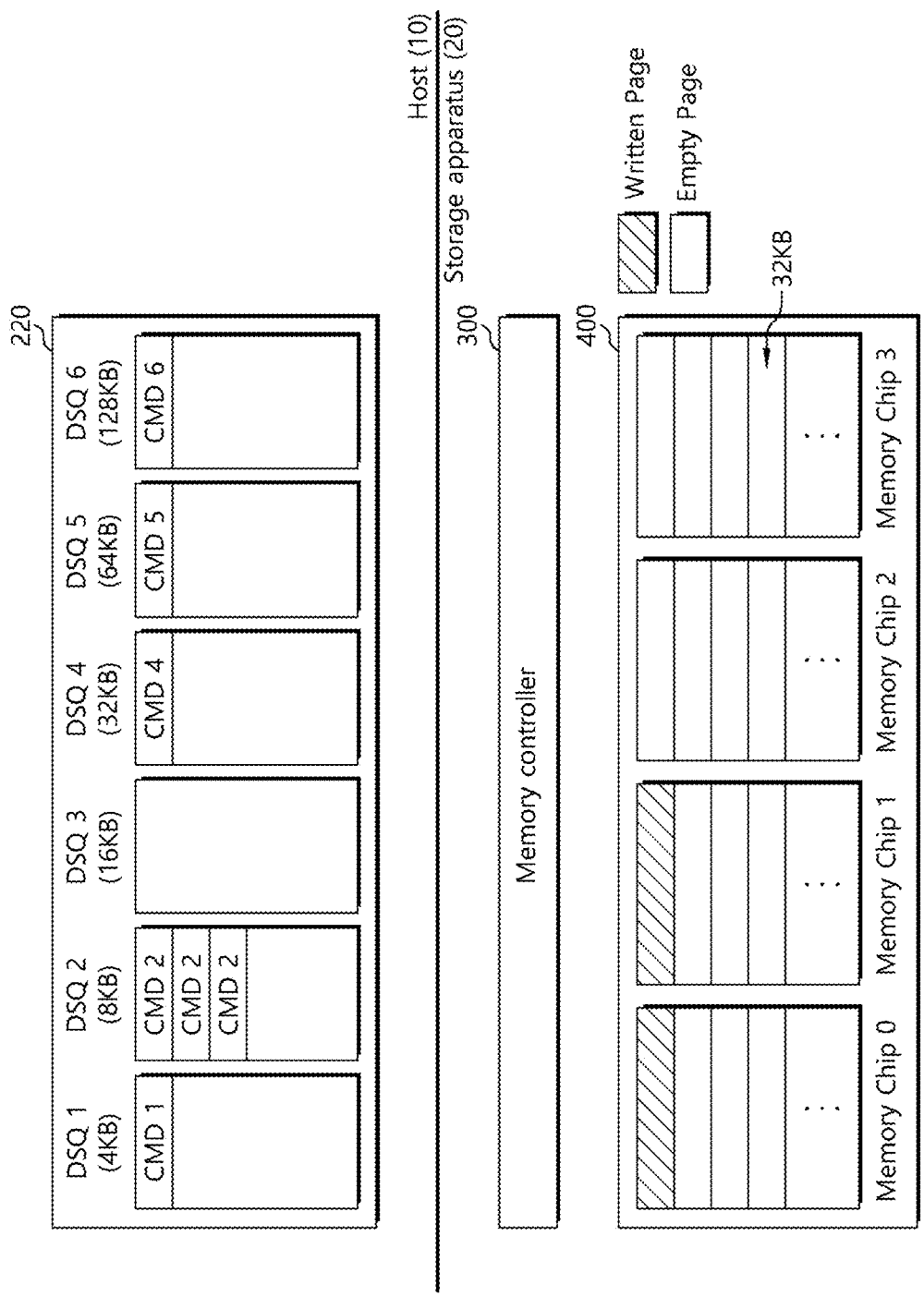

FIG. 7A illustrates the state in which one command has been queued in the first dedicated submission queue DSQ1, three commands have been queued in the second dedicated submission queue DSQ2, and one command has been queued in each of the fourth dedicated submission queue DSQ4 to sixth dedicated submission queue DSQ6.

The memory controller 300 of the storage apparatus 20 may identify the size of the remaining space of a page on which data will be stored, that is, a page to be written, in a memory chip on which a next write operation will be performed, among the first memory chip 0 to the fourth memory chip 3. As described above with reference to FIGS. 2 and 3, information including the size of the remaining space of a page to be written may be stored in the memory 320 of the memory controller 300, and may be updated in real time by the second core 330 of the memory controller 300. The first core 310 of the memory controller 300 may identify the size of the remaining space of a page to be written with reference to the NSI stored in the memory 320.

As illustrated in FIG. 7A, a page to be written in a memory chip (e.g., the third memory chip 2) on which a next write operation will be performed is an empty page. Accordingly, the size of the remaining space of a page to be written may be 32 KB.

Figure 7B:
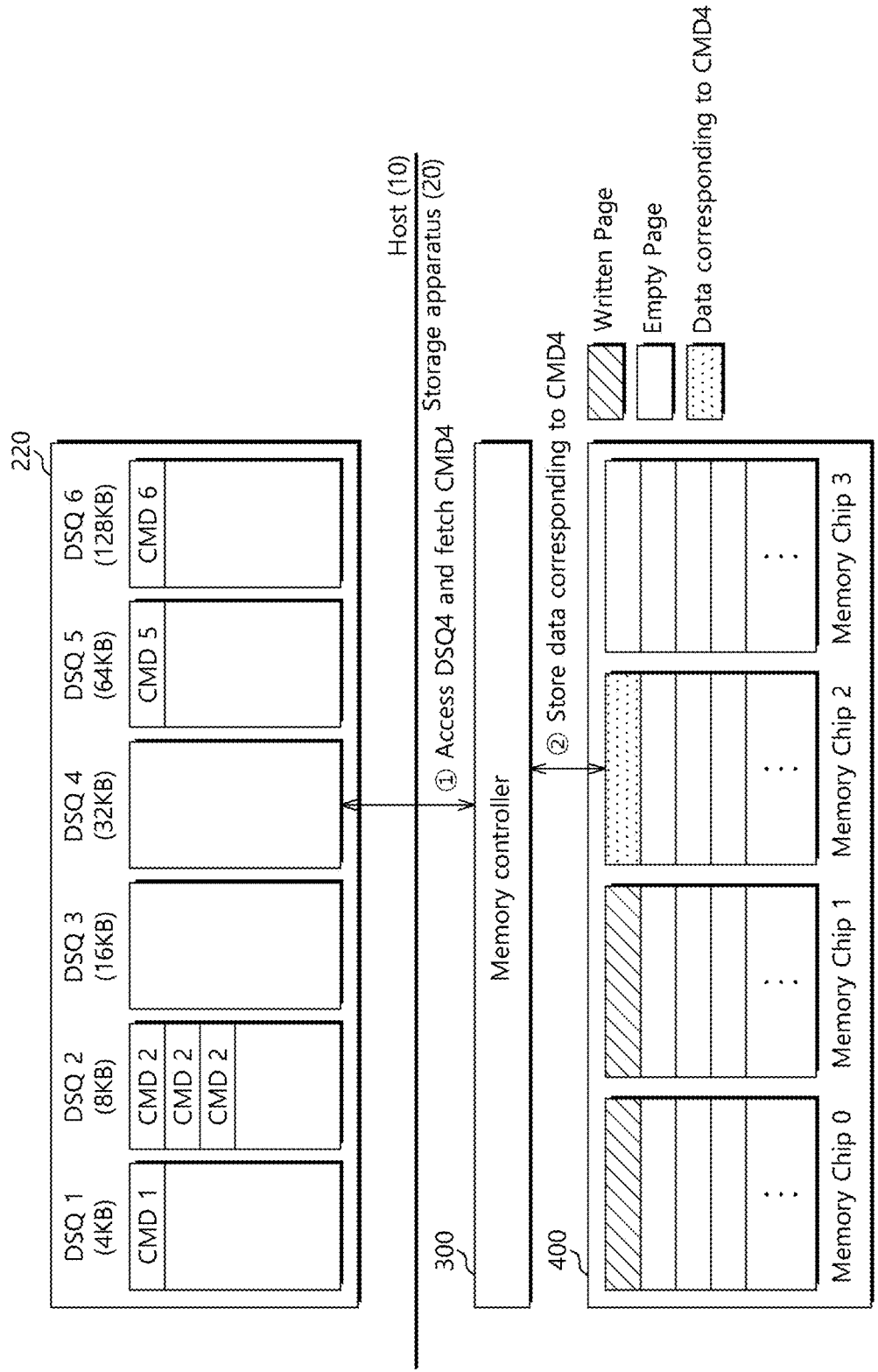

Referring to FIG. 7B, the memory controller 300 may access the fourth dedicated submission queue DSQ4 that queues one or more commands each related to data of 32 KB, and may fetch a fourth command CMD4 from the fourth dedicated submission queue DSQ4 (①). Thereafter, the memory controller 300 may control the non-volatile memory 400 to store data, corresponding to the fetched fourth command CMD4, in a page to be written in a memory chip (e.g., the third memory chip 2) (②).

Thereafter, the second core 330 of the memory controller 300 may store, in the memory 320, the size (i.e., 32 KB) of the remaining space of a page to be written in a memory chip (e.g., the fourth memory chip 3) on which a next write operation will be performed as the NSI. For example, the second core 330 may update the NSI in the memory 320 with the size of the remaining space of a page to be written in the fourth memory chip 3. The memory controller 300 may identify that the size of the remaining space of a page to be written in a memory chip (e.g., the fourth memory chip 3) on which a next write operation will be performed is 32 KB with reference to the NSI. A queued command related to data having a size (e.g., 32 KB) corresponding to one page to be written in a next write operation is not present in the fourth dedicated submission queue DSQ4. Accordingly, the memory controller 300 may access a dedicated submission queue that queues data having a size corresponding to two or more pages to be next written based on 32 KB, that is, the size of the remaining space of a subpage to be written, and may fetch a command from the dedicated submission queue. Specifically, the memory controller 300 may access a dedicated submission queue that queues data having a size that is equal to a multiple (e.g., 64 KB, 128 KB) of the size (e.g., 32 KB) of the remaining space of a page to be written in a next write operation.

For example, referring to FIG. 7C, the memory controller 300 may access the fifth dedicated submission queue DSQ5 that queues a command related to data of 64 KB, and may fetch a fifth command CMD5 from the fifth dedicated submission queue (③). Thereafter, the memory controller 300 may control the non-volatile memory 400 to store data, corresponding to the fetched fifth command CMD5, in a page of each of a plurality of memory chips (e.g., the fourth memory chip 3 and the first memory chip 0) (④). Although FIG. 7C illustrates that the memory controller 300 accesses the fifth dedicated submission queue DSQ5 that queues a command related to data of 64 KB and fetches the fifth command CMD5 from the fifth dedicated submission queue DSQ5, embodiments of the present disclosure are not limited thereto. In other embodiments, the memory controller 300 may access the sixth dedicated submission queue DSQ6 that queues a command related to data of 128 KB, and may fetch a sixth command CMD6 from the sixth dedicated submission queue DSQ6.

Thereafter, the second core 330 of the memory controller 300 may store, in the memory 320, the size (i.e., 32 KB) of a page to be written in a memory chip (e.g., the second memory chip 1) on which a next write operation will be performed as the NSI. The memory controller 300 may identify that the size of the remaining space of the page to be written is 32 KB with reference to the NSI. The memory controller 300 may access a dedicated submission queue that queues data having a size corresponding to one or more pages to be next written based on 32 KB, that is, the size of the remaining space of the page to be now written, and may fetch a command from the dedicated submission queue.

Figure 7D:
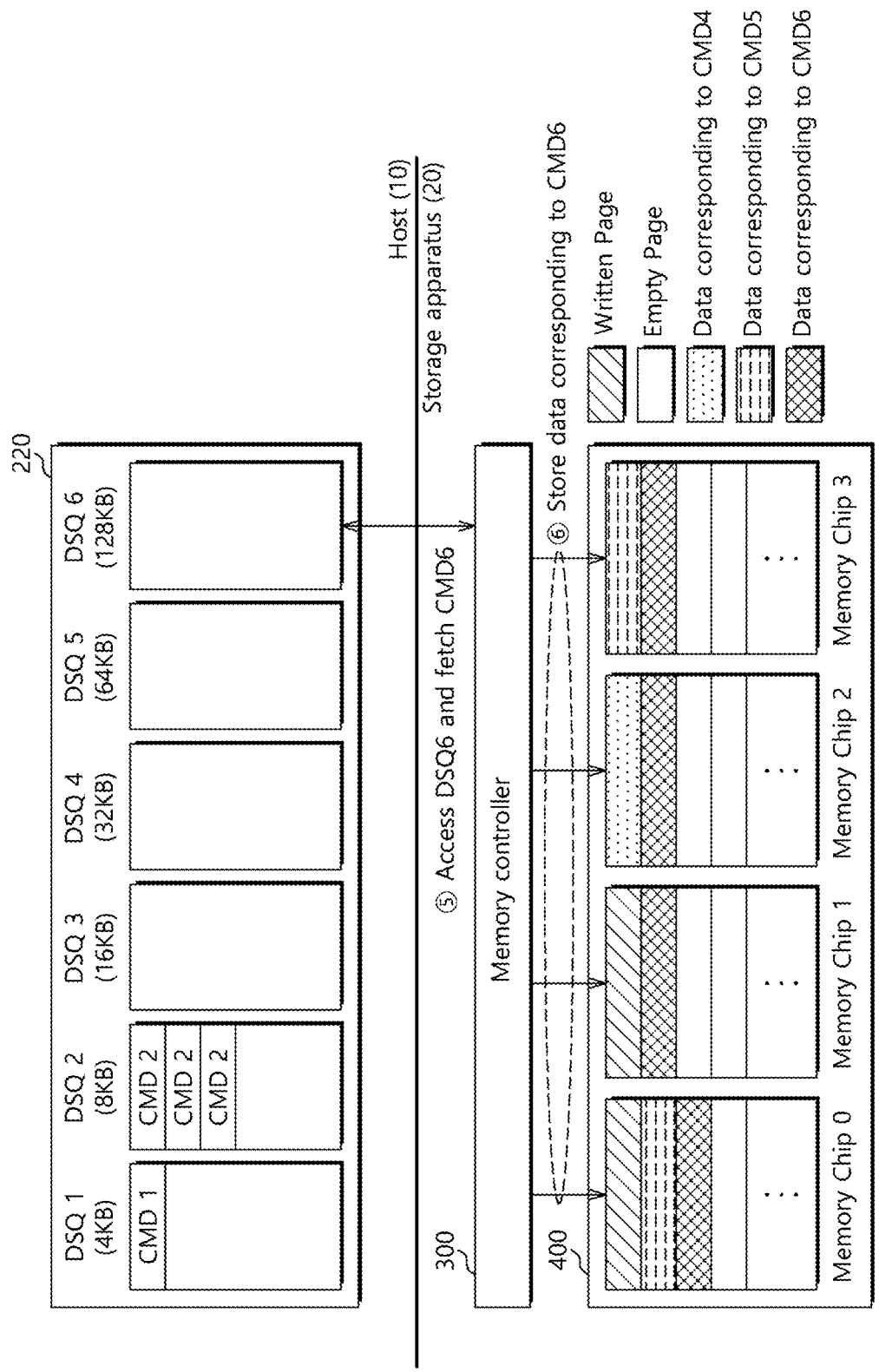

For example, referring to FIG. 7D, the memory controller 300 may access the sixth dedicated submission queue DSQ6 that queues a command related to data of 128 KB, and may fetch a sixth command CMD6 from the sixth dedicated submission queue DSQ6 (⑤). Thereafter, the memory controller 300 may control the non-volatile memory 400 to sequentially store data, corresponding to the fetched sixth command CMD6, in a page of each of a plurality of memory chips (e.g., the second memory chip 1, the third memory chip 2, the fourth memory chip 3, and the first memory chip 0) (⑥).

Thereafter, the second core 330 of the memory controller 300 may store the size (i.e., 32 KB) of a page to be written in a memory chip (e.g., the second memory chip 1) on which a next write operation will be performed as the NSI in the memory 320. The memory controller 300 may identify that the size of the remaining space of the page to be written is 32 KB with reference to the NSI.

Figure 7E:
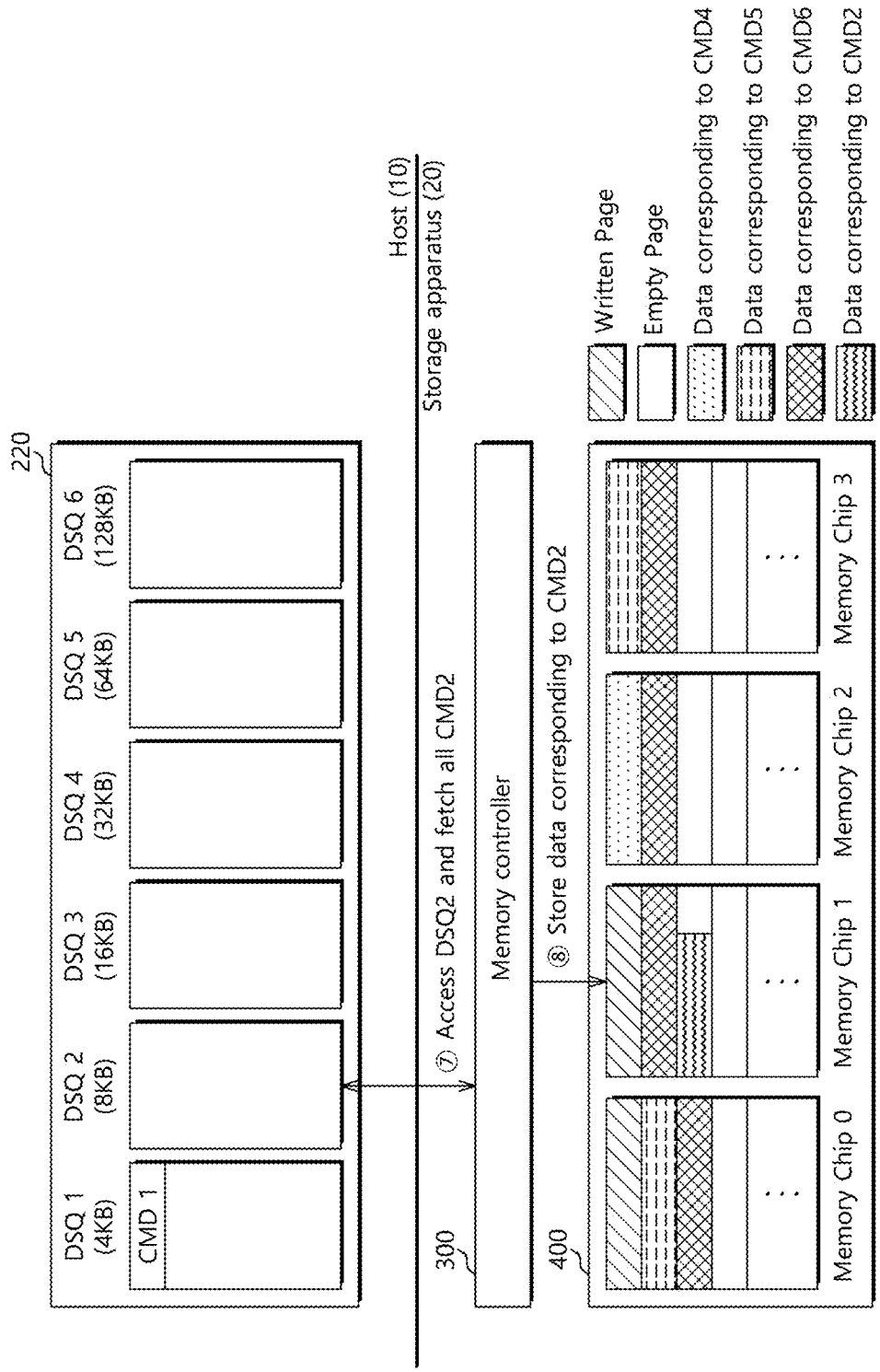

Assuming that commands are now queued in the first dedicated submission queue DSQ1 and the second dedicated submission queue DSQ2, as illustrated in FIG. 7E, the memory controller 300 may first access the second dedicated submission queue DSQ2 that queues a command related to data of 8 KB, and may fetch all of three second commands CMD2 from the second dedicated submission queue DSQ2 (⑦). Thereafter, the memory controller 300 may control the non-volatile memory 400 to store data, corresponding to the fetched three second commands CMD2, in a page to be written in a memory chip (e.g., the second memory chip 1) (⑧).

Thereafter, the second core 330 of the memory controller 300 may update the size, that is, 8 KB, of the remaining space of the page to be written in the memory chip (e.g., the second memory chip 1) as the NSI. The memory controller 300 may identify that the size of the remaining space of the page to be written is 8 KB with reference to the NSI.

Figure 7F:
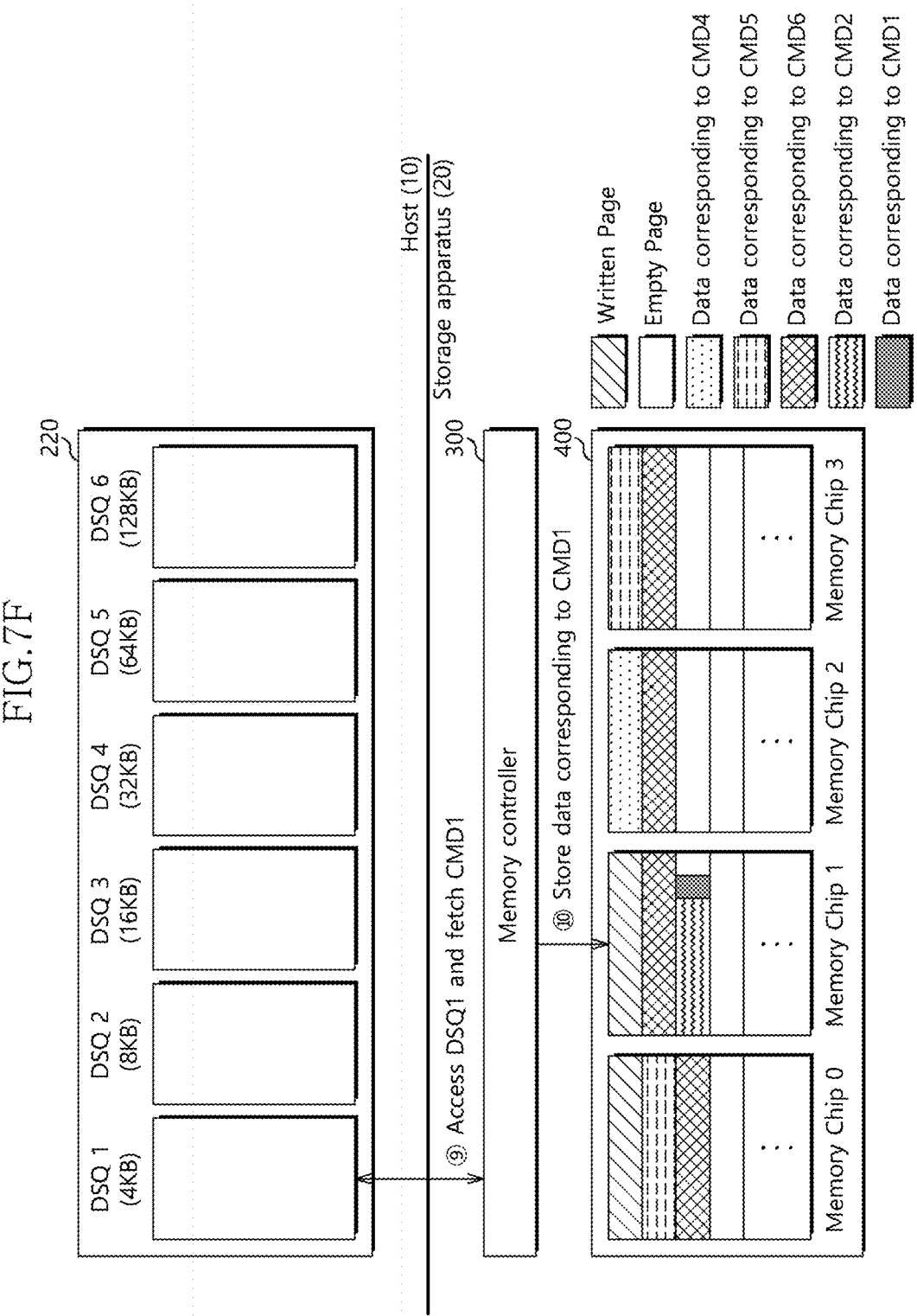

One first command CMD1 is now queued in the first dedicated submission queue DSQ1. As illustrated in FIG. 7F, the memory controller 300 may access the first dedicated submission queue DSQ1 that queues a command related to data of 4 KB, and may fetch the first command CMD1 from the first dedicated submission queue DSQ1 (⑨). Thereafter, the memory controller 300 may control the non-volatile memory 400 to store data, corresponding to the fetched first command CMD1, in the remaining space of a page to be written in a memory chip (e.g., the second memory chip 1) (⑩).

Thereafter, the second core 330 of the memory controller 300 may update the size, that is, 4 KB, of the remaining space of the page to be written in the memory chip (e.g., the second memory chip 1) as the NSI. As described above with reference to FIGS. 7A to 7F, the memory controller 300 may operate according to a specific priority. For example, the memory controller 300 may first access the fourth dedicated submission queue DSQ4 that queues one or more commands CMD4 each related to data having a size (e.g., 32 KB) that is equal to the size (e.g., 32 KB) of the remaining space of a page to be written. Subsequently, the memory controller 300 may access the fifth and sixth dedicated submission queues DSQ5 and DSQ6, each of which queues one or more commands CMD5 or CMD6 each related to data having a size that is equal to a multiple (e.g., 64 KB, 128 KB) of the size (e.g., 32 KB) of the remaining space of a page to be written in a next write operation. After data related to the commands CMD5 and CMD6 queued in the fifth and sixth dedicated submission queues DSQ5 and DSQ6 have been stored in the non-volatile memory 400, the memory controller 300 may access the first and second dedicated submission queues DSQ1 and DSQ2, each of which queues one or more commands CMD1 and CMD2 each related to data having a size that is smaller than the size (e.g., 32 KB) of the remaining space of a page to be written in a next write operation. Specifically, the memory controller 300 may access the second dedicated submission queue DSQ2 that queues the second commands CMD2 prior to the first dedicated submission queue DSQ1 that queues the first command CMD1, since each of the second commands CMD2 is related to data having a size (e.g., 8 KB) greater than a size (e.g., 4 KB) of data related to the first command CMD1 queued in the first dedicated submission queue DSQ1.

Figure 8A:
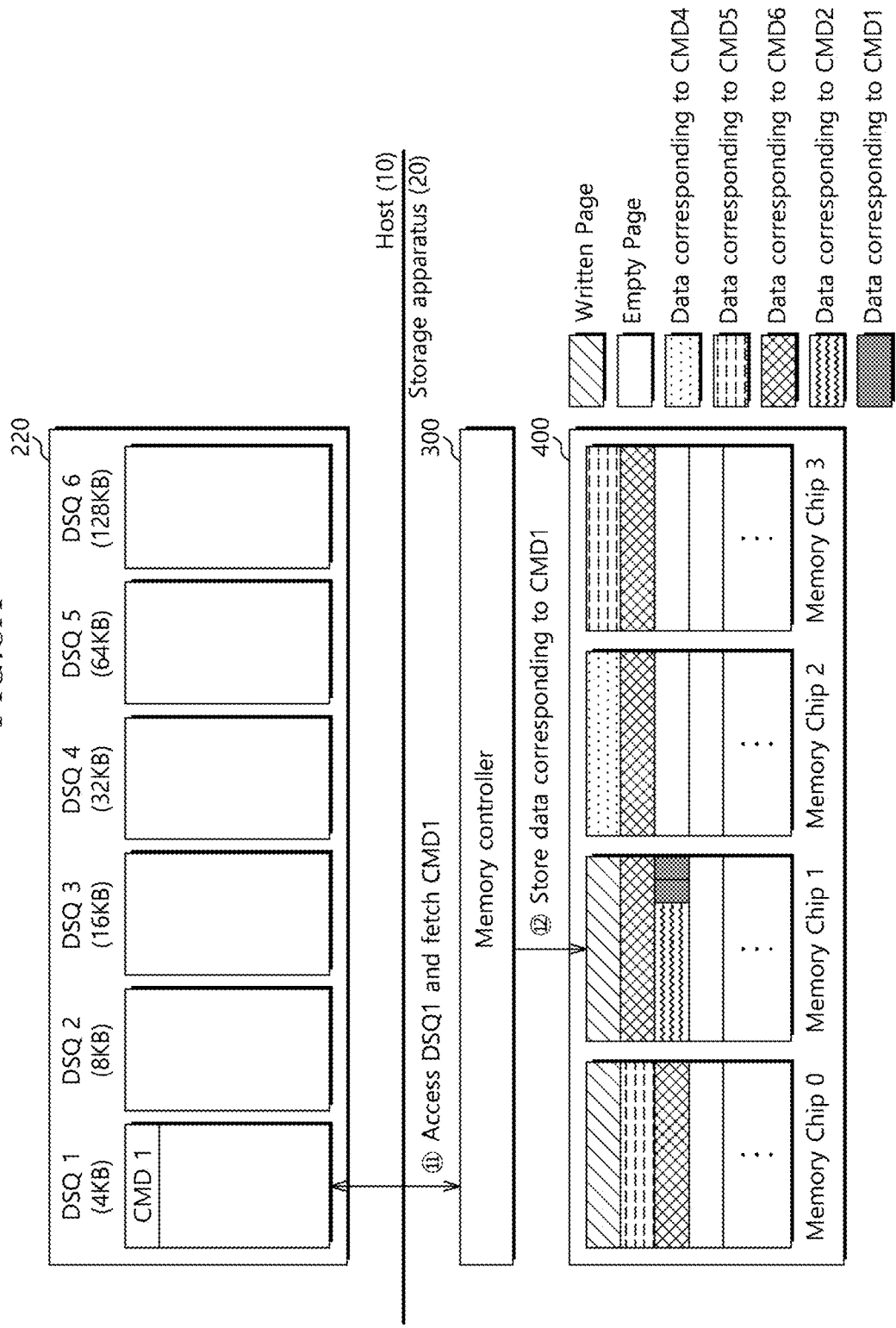
FIGS. 8A and 8B are diagrams illustrating a process of writing data in the remaining space of a subpage when a queued command is not present in dedicated submission queues according to an embodiment.
Figure 8B:
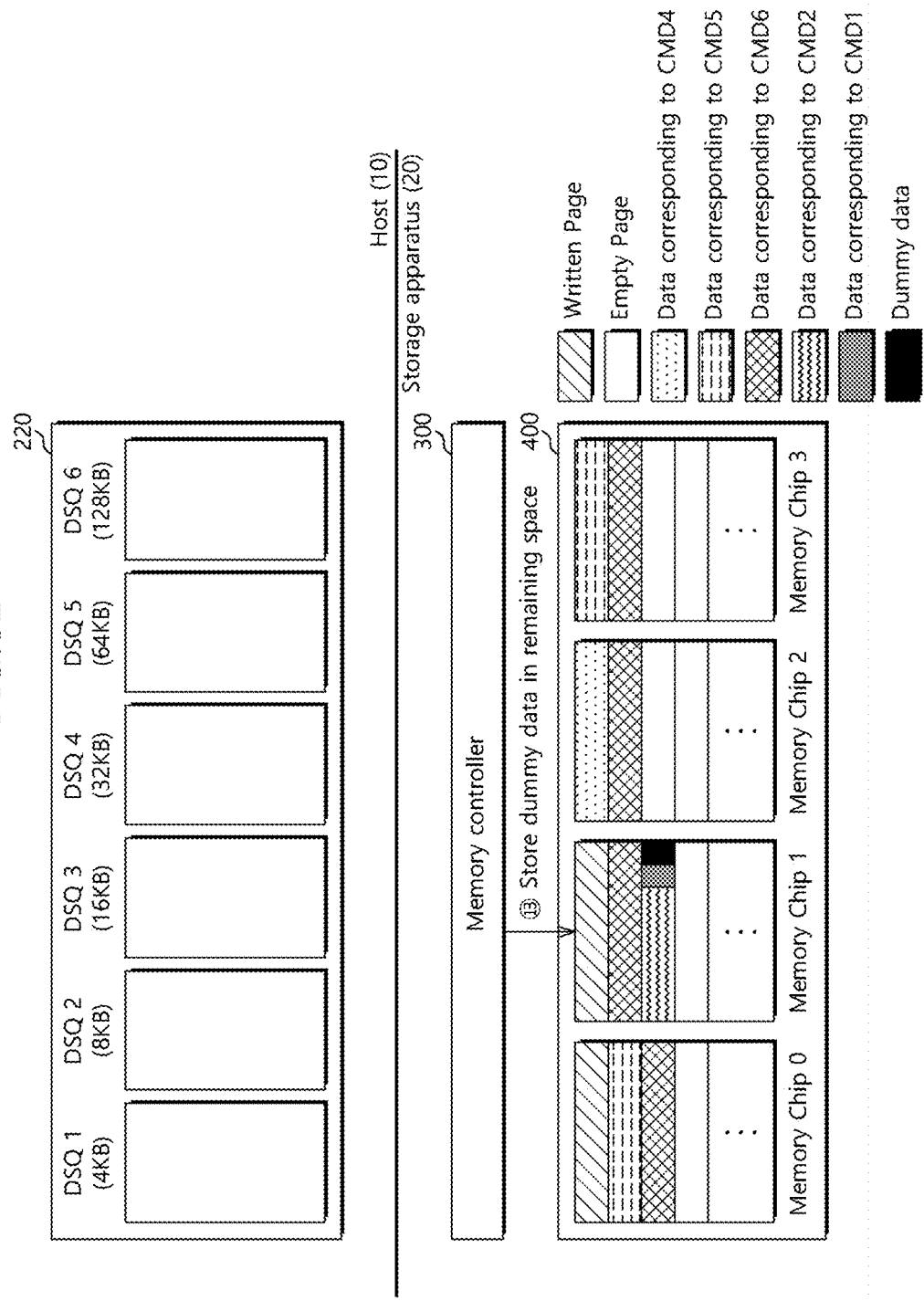

FIGS. 8A and 8B are diagrams illustrating a process of storing data in the remaining space of a page when a queued command is not present in dedicated submission queues according to an embodiment.

Referring back to FIG. 7F, a queued command is not present in the dedicated submission queues DSQ1 to DSQ6, and the size of the remaining space of a page to be written in a memory chip (e.g., memory chip 1) is 4 KB.

The memory controller 300 may determine whether the size of the remaining space of a page to be written exceeds a minimum data size. For example, referring to FIG. 2, the first core 310 of the memory controller may determine whether the size of the remaining space of the page to be written exceeds a minimum data size. The minimum data size may correspond to the size of data related to a command that belongs to commands queued in a plurality of dedicated submission queues and that has a minimum length. For example, the minimum data size may be the size of data corresponding to one logical address, but is not specially limited thereto. In the present embodiment, it is assumed that a minimum data size is 4 KB.

As illustrated in FIG. 7F, the size of the remaining space of a page to be written in the memory chip (e.g., the second memory chip 1) is 4 KB, which does not exceed the minimum data size. For example, the size of the remaining space of a page to be written in the memory chip (e.g., the second memory chip 1) is equal to the minimum data size, and the minimum data size is equal to the size of data related to a first command CMD1 queued in the first dedicated submission queue DSQ1.

The memory controller 300 may wait for a given time (or a given time period) until a first command CMD1 is queued in the first dedicated submission queue DSQ1 that queues one or more commands each related to data of 4 KB. For example, although commands are queued in one or more of the remaining second to sixth submission queues DSQ2 to DSQ6 except the first dedicated submission queue DSQ1, the first core 310 of the memory controller 300 may not fetch these commands queued in the second to sixth submission queues DSQ2 to DSQ6 for a preset waiting time (or a preset waiting period).

When a first command CMD1 is queued in the first dedicated submission queue DSQ1 within the preset waiting time, as illustrated in FIG. 8A, the memory controller 300 may access the first dedicated submission queue DSQ1 and fetch the queued first command CMD1 (⑪), and may control the non-volatile memory 400 to store data, corresponding to the fetched first command CMD1, in the remaining space of a page to be written in the memory chip (e.g., memory chip 1) (⑫).

If a first command CMD1 is not queued in the first dedicated submission queue DSQ1 within the preset waiting time, as illustrated in FIG. 8B, the memory controller 300 may control the non-volatile memory 400 to store dummy data of 4 KB in the remaining space of a page to be written in the memory chip (e.g., the second memory chip 1) (⑬). For example, the second core 33 of the memory controller 300 may control the non-volatile memory 400 to store dummy data of 4 KB in the remaining space of a page to be written in the memory chip.

As described above, according to the present embodiment, read performance for data can be improved because data related to one command can be prevented from being divided and stored in two memory chips. For example, a memory controller according to an embodiment of the present disclosure can prevent data that is related to a single command and having a size that is equal to or less than the size of a page in a memory chip from being divided and stored in two memory chips, thereby improving read performance for data.

FIG. 9 is a flowchart illustrating an operating method of the memory controller 300 according to an embodiment. Reference may be made to at least one of FIGS. 1 to 8B in describing the operating method of the memory controller 300 according to the present embodiment with reference to FIG. 9.

At step S901, the memory controller 300 may identify the size of the remaining space of a page (i.e., page to be written) on which data will be stored in a memory chip on which a next write operation will be performed. The memory controller 300 may identify the size of the remaining space of the page to be written with reference to the NSI stored in the meta region of the memory 320.

At step S903, the memory controller 300 may check whether a first write command has been queued in a dedicated submission queue (hereinafter referred to as a "first dedicated submission queue") that belongs to a plurality of dedicated submission queues allocated to the dedicated space 220 of the host memory 200 of the host 10, where the first write command is related to data having a size corresponding to the size of the remaining space of the page to be written, identified at step S901. For example, referring to FIGS. 2 and 7A, the first core 310 of the memory controller 300 may access the fourth dedicated submission queue DSQ4 to determine whether a fourth command CMD4 has been queued in the fourth dedicated submission queue DSQ4, where the command CMD4 is related to data having a size (e.g., 32 KB) that is equal to the size (e.g., 32 KB) of the remaining space of a page to be written in the third memory chip 2.

At step S905, the memory controller 300 may determine whether the first write command is present (or queued) in the first dedicated submission queue. If the first write command is present in the first dedicated submission queue, the process may proceed to step S907. If the first write command is not present in the first dedicated submission queue, the process may proceed to step S911.

At step S907, the memory controller 300 may access the first dedicated submission queue of the host 10 and fetch the first write command from the first dedicated submission queue.

At step S909, the memory controller 300 may control the non-volatile memory 400 to store data, related to the first write command, in the remaining space of the page to be written based on the fetched first write command. In this case, the memory controller 300 may read the data from the host memory 200 of the host 10 based on location information of the data included in the fetched first write command, and may provide the read data to the non-volatile memory 400. Thereafter, the process may proceed to step S901.

At step S911, the memory controller 300 may determine whether the size of the remaining space of the page to be written exceeds a minimum data size. If the size of the remaining space of the page to be written exceeds the minimum data size, the process may proceed to step S913. If the size of the remaining space of the page to be written is the minimum data size, the process may proceed to step S915.

At step S913, the memory controller 300 may fetch write commands from at least two second dedicated submission queues that belong to the plurality of dedicated submission queues and that queue write commands each related to data having a size smaller than the size of the remaining space of the page to be written, and may control the non-volatile memory 400 to store data, corresponding to the fetched write commands, in the remaining space of the page to be written. In this case, the memory controller 300 may select second dedicated submission queues so that the size of the data to be stored in the remaining space of the page to be written is aligned with the size of the remaining space of the page to be written, and may fetch the write commands from the selected second dedicated submission queues. That is, the sum of the sizes of data related to the fetched write commands is matched with the size of the remaining space of the page to be written by combining the data related to multiple write commands. For example, assuming that the size of the remaining space of the page to be written can be 16 KB, the first dedicated submission queue DSQ1 can queue two commands CMD1 each related to data of 4 KB, and the second dedicated submission queue DSQ2 can queue a single command CMD2 related to data of 8 KB, the sum (i.e., 2*4 KB+8 KB=16 KB) of the sizes of data related to the two commands CDM1 and the single command CMD2 would be matched with the size (e.g., 16 KB) of the remaining space of the page to be written. In an embodiment, the memory controller 300 may select a single second dedicated submission queue, when the single second dedicated submission queue queues a plurality of commands and the sum of the sizes of data related to the plurality of commands is matched with the size of the remaining space of a page to be written by combining the data related to the plurality of commands. For example, assuming that the size of the remaining space of a page to be written can be 16 KB, and the single second dedicated submission queue DSQ2 can queue two commands CMD2 each related to data of 8 KB, the sum (i.e., 2*8 KB=16 KB) of the sizes of data related to the two commands CDM2 would be matched with the size (e.g., 16 KB) of the remaining space of the page to be written. In an embodiment, when the sum of the sizes of data related to the fetched write commands cannot be exactly matched with the size of the remaining space of a page to be written by combining the data related to multiple write commands, the sum of the sizes of data related to the fetched write commands would be matched as close as possible with the size of the remaining space of the page to be written.

Furthermore, at step S913, the memory controller 300 may fetch a write command from each of one or more third dedicated submission queues that belong to the plurality of dedicated submission queues and that queue a write command related to data having a size greater than the size of the remaining space of the page to be written, and may control the non-volatile memory 400 to store data, corresponding to the fetched write command, in the remaining space of a page to be now written to a page of a memory chip to be next written. In this case, the number of pages of the memory chip to be next written may be one or more. For example, referring to FIG. 7C, the memory controller 300 may fetch the command CMD5 from the fifth dedicated submission queue DSQ5, and may control the non-volatile memory 400 to store data related to the fetched command CMD5 in a page of the fourth memory chip 3 and a page of the first memory chip 0. Thereafter, the process may proceed to step S901.

At step S915, the memory controller 300 may wait for a preset time period until a first write command is queued in the first dedicated submission queue. That is, although commands are present in the remaining dedicated submission queues except the first dedicated submission queue, the memory controller 300 may wait for a given time period without fetching the commands from the remaining dedicated submission queues.

At step S917, the memory controller 300 may determine whether a first write command has been queued in the first dedicated submission queue. For example, at S917, the first dedicated submission queue (e.g., the first dedicated submission queue DSQ1 in FIGS. 7A to 8B) may queue the first write command (e.g., the first command CMD1 in FIGS. 7A to 8B) related to data having the minimum data size. If the first write command has been queued in the first dedicated submission queue, the process may proceed to step S907. If the first write command has not been queued in the first dedicated submission queue, the process may proceed to step S919.

At step S919, the memory controller 300 may control the non-volatile memory 400 to store dummy data in the remaining space of the page to be written. The dummy data may have a size corresponding to the size of the remaining space of the page to be written.

Figure 10:
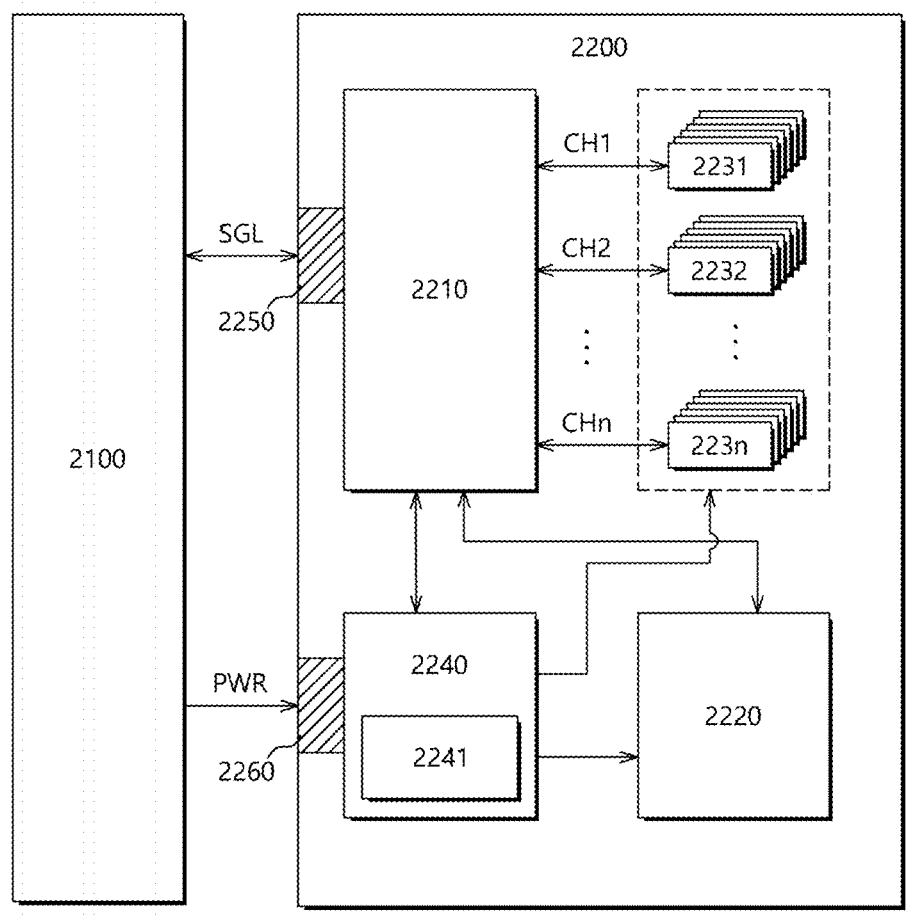
FIG. 10 is a diagram illustrating a data processing system including a solid state drive (SSD) in accordance with an embodiment.

FIG. 10 illustrates a data processing system including a solid state drive (SSD) in accordance with an embodiment. Referring to FIG. 10, a data processing system 2000 may include a host apparatus 2100 and an SSD 2200.

The SSD 2200 may include a controller 2210, a buffer memory device 2220, nonvolatile memory devices 2231 to 223n, a power supply 2240, a signal connector 2250, and a power connector 2260.

The controller 2210 may control an overall operation of the SSD 2220.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host apparatus 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to the one channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is normally terminated even when sudden power-off occurs. The auxiliary power supply 2241 may include large capacity capacitors capable of charging the power PWR.

The controller 2210 may exchange a signal SGL with the host apparatus 2100 through the signal connector 2250. The signal SGL may include a command, an address, data, and the like. The signal connector 2250 may be configured of various types of connectors according to an interfacing method between the host apparatus 2100 and the SSD 2200.

Figure 11:
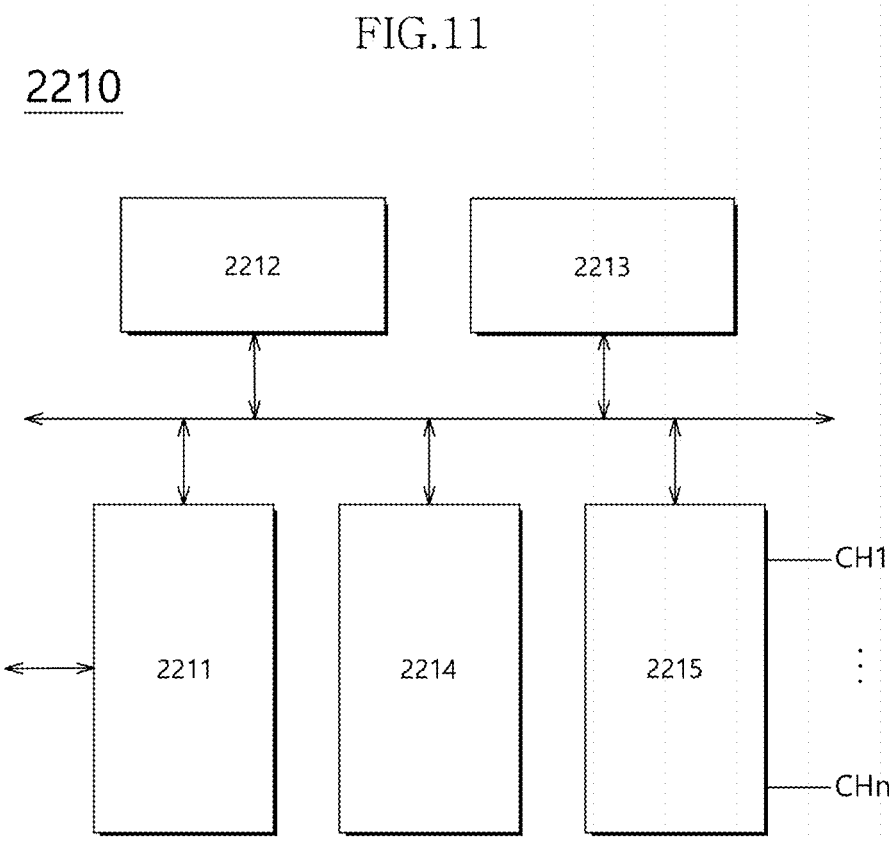
FIG. 11 is a diagram illustrating a controller in FIG. 10 in accordance with an embodiment.

FIG. 11 illustrates the controller 2210 of FIG. 10 according to an embodiment. Referring to FIG. 11, the controller 2210 may include a host interface unit 2211, a control unit 2212, a random access memory (RAM) 2213, an error correction code (ECC) unit 2214, and a memory interface unit 2215.

The host interface unit 2211 may perform interfacing between the host apparatus 2100 and the SSD 2200 according to a protocol of the host apparatus 2100. For example, the host interface unit 2211 may communicate with the host apparatus 2100 through any one among a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, and a universal flash storage (UFS) protocol. The host interface unit 2211 may perform a disc emulation function that the host apparatus 2100 recognizes the SSD 2200 as a general-purpose data storage apparatus, for example, a hard disc drive (HDD).

The control unit 2212 may analyze and process the signal SGL input from the host apparatus 2100. The control unit 2212 may control operations of internal functional blocks according to firmware and/or software for driving the SDD 2200. The RAM 2213 may operate as a working memory for driving the firmware or software.

The ECC unit 2214 may generate parity data for the data to be transferred to the nonvolatile memory devices 2231 to 223n. The generated parity data may be stored in the nonvolatile memory devices 2231 to 223n together with the data. The ECC unit 2214 may detect errors for data read from the nonvolatile memory devices 2231 to 223n based on the parity data. When detected errors are within a correctable range, the ECC unit 2214 may correct the detected errors.

The memory interface unit 2215 may provide a control signal such as a command and an address to the nonvolatile memory devices 2231 to 223n according to control of the control unit 2212. The memory interface unit 2215 may exchange data with the nonvolatile memory devices 2231 to 223n according to control of the control unit 2212. For example, the memory interface unit 2215 may provide data stored in the buffer memory device 2220 to the nonvolatile memory devices 2231 to 223n or provide data read from the nonvolatile memory devices 2231 to 223n to the buffer memory device 2220.

Figure 12:
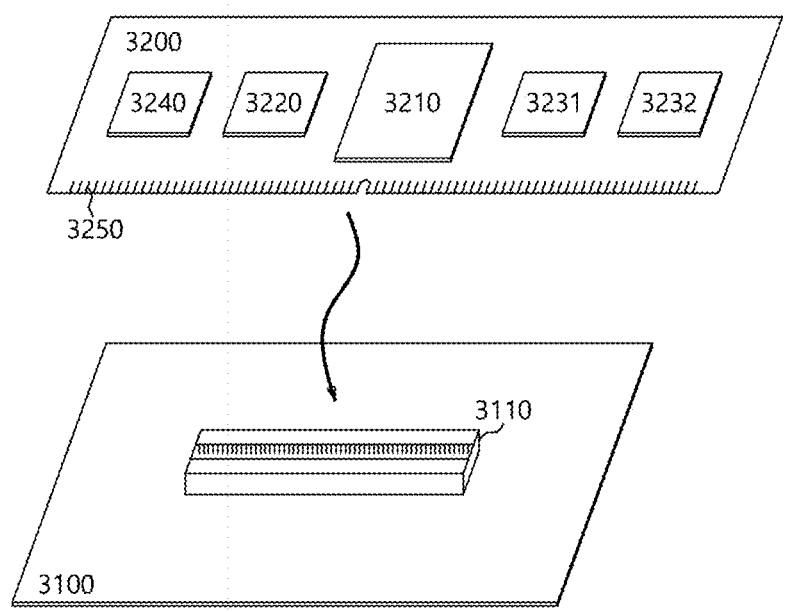
FIG. 12 is a diagram illustrating a data processing system including a data storage apparatus in accordance with an embodiment.

FIG. 12 illustrates a data processing system 3000 including a data storage apparatus 3200 in accordance with an embodiment. Referring to FIG. 12, the data processing system 3000 may include a host apparatus 3100 and the data storage apparatus 3200.

The host apparatus 3100 may be configured in a board form such as a printed circuit board (PCB). Although not shown in FIG. 12, the host apparatus 3100 may include internal functional blocks configured to perform functions of the host apparatus 3100.

The host apparatus 3100 may include a connection terminal 3110 such as a socket, a slot, or a connector. The data storage apparatus 3200 may be mounted on the connection terminal 3110.

The data storage apparatus 3200 may be configured in a board form such as a PCB. The data storage apparatus 3200 may refer to a memory module or a memory card. The data storage apparatus 3200 may include a controller 3210, a buffer memory device 3220, nonvolatile memory devices 3231 and 3232, a power management integrated circuit (PMIC) 3240, and a connection terminal 3250.

The controller 3210 may control an overall operation of the data storage apparatus 3200. The controller 3210 may be configured to have the same configuration as the controller 2210 illustrated in FIG. 11.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host apparatus 3100 or the nonvolatile memory devices 3231 and 3232 according to control of the controller 3210.

The nonvolatile memory devices 3231 and 3232 may be used as a storage medium of the data storage apparatus 3200.

The PMIC 3240 may provide power input through the connection terminal 3250 to the inside of the data storage apparatus 3200. The PMIC 3240 may manage the power of the data storage apparatus 3200 according to control of the controller 3210.

The connection terminal 3250 may be coupled to the connection terminal 3110 of the host apparatus 3100. A signal such as a command, an address, and data and power may be transmitted between the host apparatus 3100 and the data storage apparatus 3200 through the connection terminal 3250. The connection terminal 3250 may be configured in various forms according to an interfacing method between the host apparatus 3100 and the data storage apparatus 3200. The connection terminal 3250 may be arranged in any one side of the data storage apparatus 3200.

Figure 13:
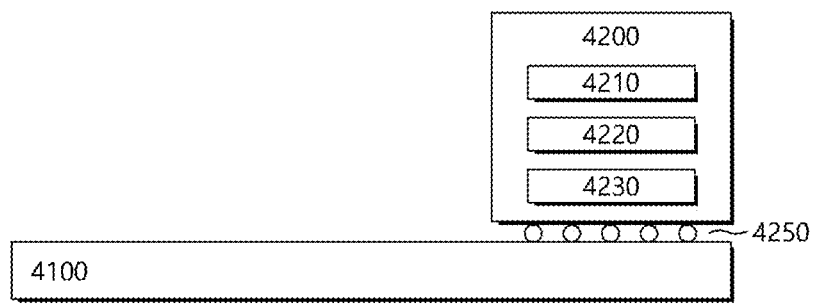
FIG. 13 is a diagram illustrating a data processing system including a data storage apparatus in accordance with an embodiment.

FIG. 13 illustrates a data processing system 4000 including a data storage apparatus 4200 in accordance with an embodiment. Referring to FIG. 13, the data processing system 4000 may include a host apparatus 4100 and the data storage apparatus 4200.

The host apparatus 4100 may be configured in a board form such as a PCB. Although not shown in FIG. 13, the host apparatus 4100 may include internal functional blocks configured to perform functions of the host apparatus 4100.

The data storage apparatus 4200 may be configured in a surface mounting packaging form. The data storage apparatus 4200 may be mounted on the host apparatus 4100 through one or more solder balls 4250. The data storage apparatus 4200 may include a controller 4210, a buffer memory device 4220, and a nonvolatile memory device 4230.

The controller 4210 may control an overall operation of the data storage apparatus 4200. The controller 4210 may be configured to have the same configuration as the controller 2210 illustrated in FIG. 11.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 through control of the controller 4210.

The nonvolatile memory device 4230 may be used as a storage medium of the data storage apparatus 4200.

Figure 14:
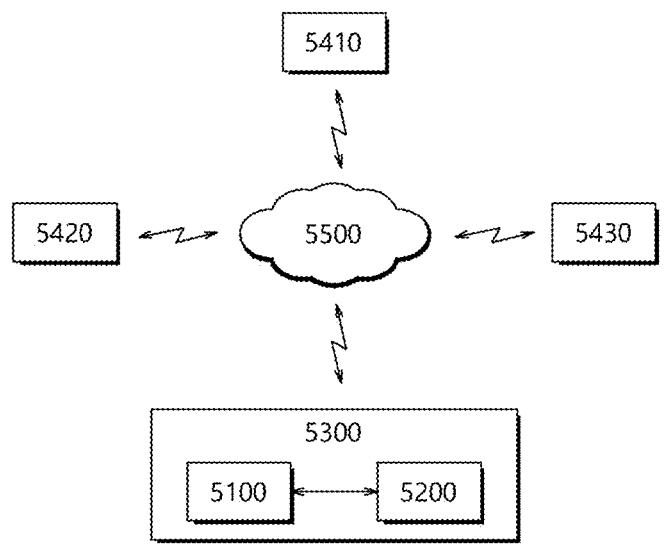
FIG. 14 is a diagram illustrating a network system including a data storage apparatus in accordance with an embodiment.

FIG. 14 illustrates a network system 5000 including a data storage apparatus in accordance with an embodiment. Referring to FIG. 14, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and a data storage apparatus 5200. The data storage apparatus 5200 may be configured of the storage apparatus 20 of FIG. 1, the SSD 2200 of FIG. 10, the data storage apparatus 3200 of FIG. 12, or the data storage apparatus 4200 of FIG. 13.

Figure 15:
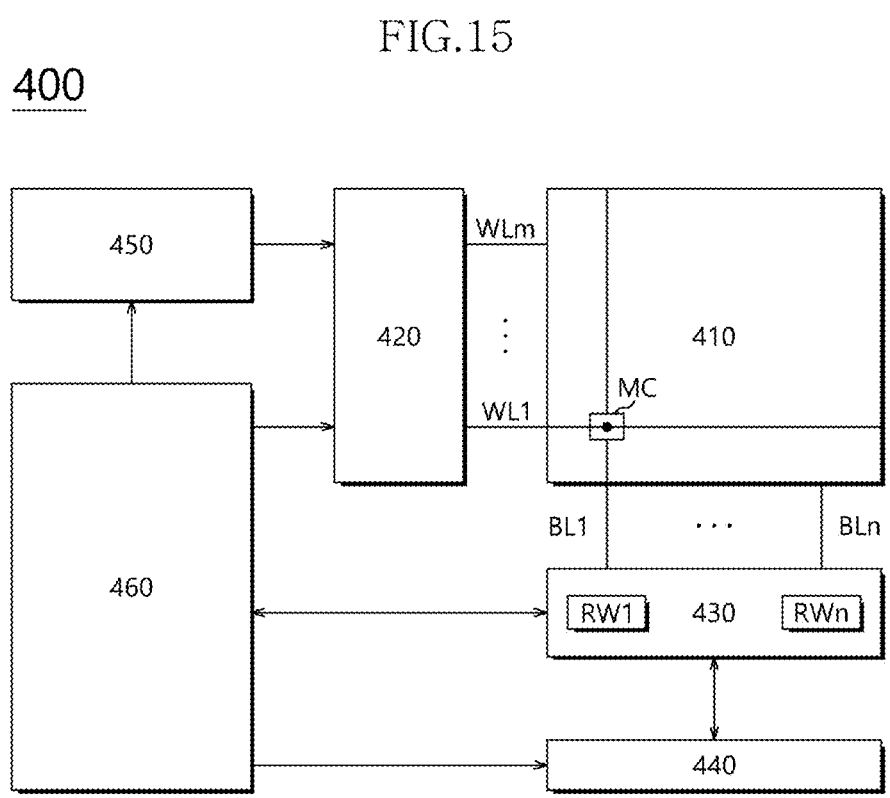
FIG. 15 is a diagram illustrating a nonvolatile memory device included in a data storage apparatus in accordance with an embodiment.

FIG. 15 illustrates a nonvolatile memory device 400 included in a data storage apparatus in accordance with an embodiment. Referring to FIG. 15, the nonvolatile memory device 400 may include a memory cell array 410, a row decoder 420, a column decoder 440, a data read/write block 430, a voltage generator 450, and a control logic 460.

The memory cell array 410 may include memory cells MC arranged in regions in which word lines WL1 to WLm and bit lines BL1 to BLn cross to each other.

The row decoder 420 may be coupled to the memory cell array 410 through the word lines WL1 to WLm. The row decoder 420 may operate through control of the control logic 460. The row decoder 420 may decode an address provided from an external apparatus (not shown). The row decoder 420 may select and drive the word lines WL1 to WLm based on a decoding result. For example, the row decoder 420 may provide a word line voltage provided from the voltage generator 450 to the word lines WL1 to WLm.

The data read/write block 430 may be coupled to the memory cell array 410 through the bit lines BL1 to BLn. The data read/write block 430 may include read/write circuits RW1 to RWn corresponding to the bit lines BL1 to BLn. The data read/write block 430 may operate according to control of the control logic 460. The data read/write block 430 may operate as a write driver or a sense amplifier according to an operation mode. For example, the data read/write block 430 may operate as the write driver configured to store data provided from an external apparatus in the memory cell array 410 in a write operation. In another example, the data read/write block 430 may operate as the sense amplifier configured to read data from the memory cell array 410 in a read operation.

The column decoder 440 may operate though control of the control logic 460. The column decoder 440 may decode an address provided from an external apparatus (not shown). The column decoder 440 may couple the read/write circuits RW1 to RWn of the data read/write block 430 corresponding to the bit lines BL1 to BLn and data input/output (I/O) lines (or data I/O buffers) based on a decoding result.

The voltage generator 450 may generate voltages used for an internal operation of the nonvolatile memory device 100. The voltages generated through the voltage generator 450 may be applied to the memory cells of the memory cell array 410. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 460 may control an overall operation of the nonvolatile memory device 400 based on a control signal provided from an external apparatus. For example, the control logic 460 may control an operation of the nonvolatile memory device 400 such as a read operation, a write operation, an erase operation of the nonvolatile memory device 400.

While various embodiments have been described above, it will be understood to those skilled in the art that the embodiments described are by way of example only. Accordingly, the memory controller, storage apparatus and operating method described herein should not be limited based on the described embodiments.

What is claimed is:

1. A memory controller for controlling a plurality of memory chips of a non-volatile memory, the memory controller comprising:

a first core configured to identify a size of a remaining space of a page to be written in a memory chip on which a write operation is to be performed among the plurality of memory chips and fetch a first write command from a first submission queue among a plurality of submission queues included in a host, the first write command being related to data having a size corresponding to that of the remaining space of the page to be written; and a second core configured to control the non-volatile memory to store data related to the fetched first write command in the remaining space of the page to be written, wherein the first core of the memory controller is further configured to determine whether the size of the remaining space of the page to be written exceeds a minimum data size in response to a determination that the first write command is not present in the first submission queue, wherein the first core of the memory controller is further configured to fetch one or more second write commands from one or more second submission queues other than the first submission queue when the size of the remaining space of the page to be written exceeds the minimum data size.

2. The memory controller according to claim 1, wherein the memory controller comprises a memory storing submission queue information that includes information on each of the plurality of submission queues.

3. The memory controller according to claim 2, wherein the submission queue information comprises a depth, a base address, an identification (ID), a type of a queued command of each of the plurality of submission queues, and a size of data related to the queued command.

4. The memory controller according to claim 2, wherein the memory further stores non-volatile memory state information comprising the size of the remaining space of the page to be written.

5. The memory controller according to claim 1, wherein the first core of the memory controller is further configured to access the first submission queue to determine whether the first write command is present in the first submission queue.

6. The memory controller according to claim 1, wherein the first core of the memory controller is further configured to wait for a given time period without fetching a write command from other submission queues than the first submission queue, when the size of the remaining space of the page to be written is the minimum data size or less.

7. The memory controller according to claim 6, wherein the second core of the memory controller is further configured to control the non-volatile memory to store dummy data in the remaining space of the page to be written when the first write command is not present in the first submission queue during the given time period.

8. The memory controller according to claim 1,
wherein the second core of the memory controller is further configured to control the non-volatile memory to store data related to the second write commands in the remaining space of the page to be written.

9. A storage apparatus, comprising:
a non-volatile memory comprising a plurality of memory chips;
a memory configured to store submission queue information comprising information on each of a plurality of submission queues that are included in a host and store non-volatile memory state information comprising a size of a remaining space of a page to be written in a memory chip on which a write operation is to be performed among the plurality of memory chips; and
a memory controller configured to identify the size of the remaining space of the page to be written based on the non-volatile memory state information, access a first submission queue among the plurality of submission queues based on the submission queue information to determine whether a first write command is present in the first submission queue, the first write command being related to data having a size corresponding to that of the remaining space of the page to be written, and fetch the first write command from the first submission queue,
wherein the memory controller is further configured to determine whether the size of the remaining space of the page to be written exceeds a minimum data size in response to a determination that the first write command is not present in the first submission queue,
wherein the memory controller is further configured to fetch one or more second write commands from one or more second submission queues other than the first submission queue when the size of the remaining space of the page to be written exceeds the minimum data size.

10. The storage apparatus according to claim 9, wherein the memory controller is further configured to wait for a given time period without fetching a write command from other submission queues than the first submission queue, when the size of the remaining space of the page to be written is the minimum data size or less.

11. The storage apparatus according to claim 10, wherein the memory controller is further configured to control the non-volatile memory to store dummy data in the remaining space of the page to be written when the first write command is not present in the first submission queue during the given time period.

12. An operating method of a memory controller that controls a non-volatile memory, the operating method comprising:
identifying a size of a remaining space of a page to be written in a memory chip on which a write operation is to be performed;
accessing a first submission queue among a plurality of submission queues that are included in a host and fetching a first write command from the first submission queue, the first write command being related to data having a size corresponding to that of the remaining space of the page to be written; and
controlling, by the memory controller, the non-volatile memory to store the data in the remaining space of the page to be written in response to the first write command;
determining the first write command is not present in the first submission queue;
determining the size of the remaining space of the page to be written exceeds a minimum data size in response to a determination that the first write command is not present in the first submission queue; and
fetching one or more second write commands from one or more second submission queues other than the first submission queue when the size of the remaining space of the page to be written exceeds the minimum data size.

13. The operating method according to claim 12, wherein the fetching of the first write command from the first submission queue comprises determining the first write command is present in the first submission queue.

14. The operating method according to claim 12, further comprising waiting for a given time period without fetching a write command from other submission queues than the first submission queue when the size of the remaining space of the page to be written is the minimum data size or less.

15. The operating method according to claim 14, further comprising controlling of the non-volatile memory to store the dummy data in the remaining space of the page to be written if the first write command is not present in the first submission queue during the given time period.

16. The operating method according to claim 12, further comprising:
controlling the non-volatile memory to store data in the remaining space of the page to be written in response to the second write commands.

* * * * *